United States Patent
Lee et al.

(10) Patent No.: US 8,588,161 B2
(45) Date of Patent: Nov. 19, 2013

(54) APPARATUS AND METHOD FOR TRANSMITTING SIGNAL IN WIRELESS COMMUNICATION SYSTEM

(75) Inventors: Moon Il Lee, Anyang-si (KR); Wook Bong Lee, Anyang-si (KR); Ja Ho Koo, Anyang-si (KR); Hyun Soo Ko, Anyang-si (KR); Jae Hoon Chung, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 13/143,725

(22) PCT Filed: Jan. 29, 2010

(86) PCT No.: PCT/KR2010/000548
§ 371 (c)(1),
(2), (4) Date: Jul. 7, 2011

(87) PCT Pub. No.: WO2010/090415
PCT Pub. Date: Aug. 12, 2010

(65) Prior Publication Data
US 2011/0268072 A1    Nov. 3, 2011

Related U.S. Application Data

(60) Provisional application No. 61/149,711, filed on Feb. 4, 2009.

(30) Foreign Application Priority Data

Jan. 28, 2010    (KR) .................. 10-2010-0008125

(51) Int. Cl.
*H04W 4/00*    (2009.01)
(52) U.S. Cl.
USPC ......................................................... 370/329

(58) Field of Classification Search
None
See application file for complete search history.

(56) References Cited

U.S. PATENT DOCUMENTS

| | | | |
|---|---|---|---|
| 2007/0053282 A1* | 3/2007 | Tong et al. ................ | 370/208 |
| 2007/0115864 A1* | 5/2007 | Bar-Ness et al. ........... | 370/278 |
| 2007/0263746 A1* | 11/2007 | Son ........................ | 375/267 |
| 2008/0013610 A1* | 1/2008 | Varadarajan et al. ...... | 375/221 |
| 2008/0225960 A1 | 9/2008 | Kotecha et al. | |
| 2008/0227495 A1 | 9/2008 | Kotecha et al. | |
| 2008/0232325 A1* | 9/2008 | Mehta et al. ............. | 370/332 |
| 2010/0103906 A1* | 4/2010 | Montojo et al. ........... | 370/335 |
| 2010/0128697 A1* | 5/2010 | Choi-Grogan ............. | 370/332 |
| 2010/0135257 A1* | 6/2010 | Higuchi et al. ............ | 370/336 |
| 2011/0002290 A1* | 1/2011 | Kim et al. ................ | 370/329 |

FOREIGN PATENT DOCUMENTS

| | | |
|---|---|---|
| KR | 1020080036939 | 4/2008 |
| KR | 1020080086333 | 9/2008 |

* cited by examiner

*Primary Examiner* — John Blanton
(74) *Attorney, Agent, or Firm* — Lee, Hong, Degerman, Kang & Waimey

(57) ABSTRACT

An apparatus and method for transmitting signals in a wireless communication system are provided. The apparatus includes N antennas, a processor coupled to the N antennas and configured to generate N transmit signals by performing precoding on R spatial streams for R spatial layers, and to transmit the N transmit signals respectively through the N antennas, wherein an information stream, a reference signal sequence, and a reference signal pattern are allocated to each of the R spatial layers, and the reference signal pattern is a time-frequency resource pattern used for transmission of the reference signal sequence, wherein each of the R spatial streams corresponds to one spatial layer, and wherein each of the R spatial streams is generated based on the information stream, reference signal sequence, and reference signal pattern allocated to a corresponding spatial layer.

13 Claims, 22 Drawing Sheets

Antenna #5

Antenna #5

Fig. 26
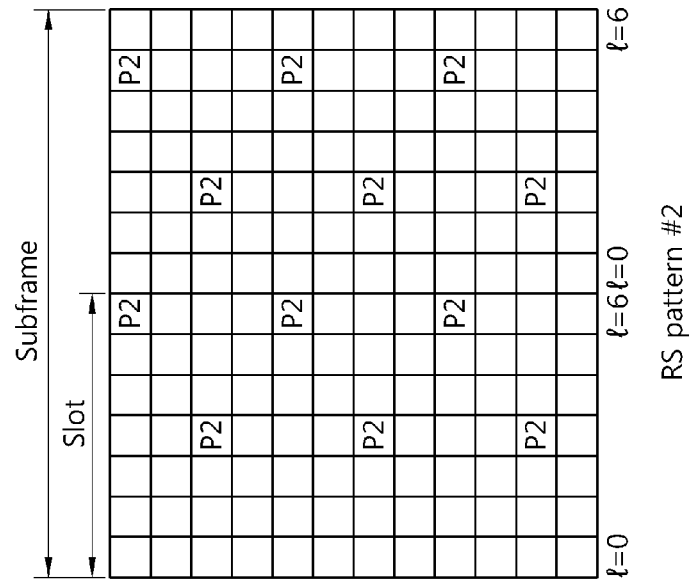
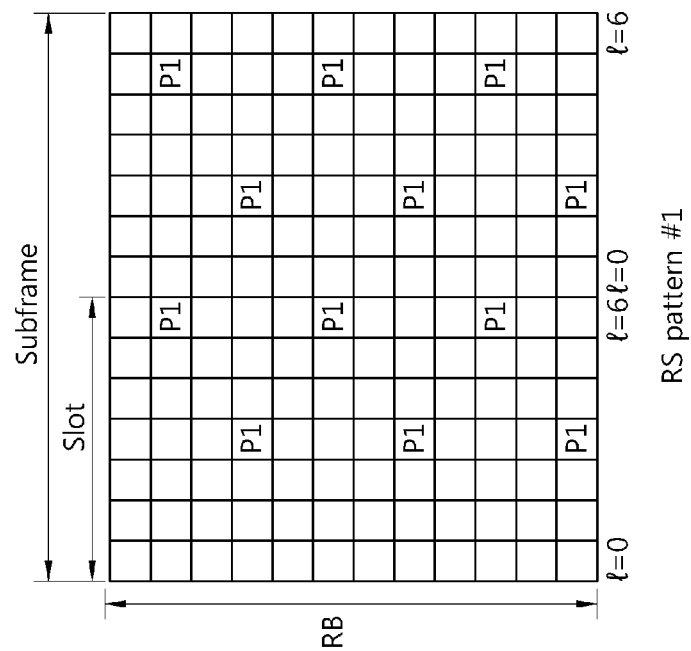
Fig. 27
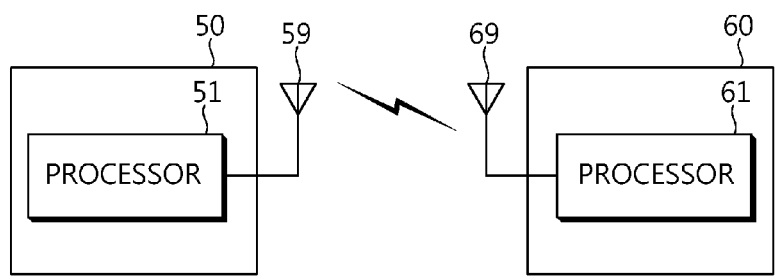

APPARATUS AND METHOD FOR TRANSMITTING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2010/000548, filed on Jan. 29, 2010, which claims the benefit of earlier filing date and right of priority to Korean Application No. 10-2010-0008125, filed on Jan. 28, 2010, and also claims the benefit of U.S. Provisional Application Ser. No. 61/149,711, filed on Feb. 4, 2009, the contents of all of which are incorporated by reference herein in their entirety.

TECHNICAL FIELD

The present invention relates to wireless communications, and more particularly, to an apparatus and method for transmitting signals in a wireless communication system.

BACKGROUND ART

Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as path loss, noise, fading due to multipath, an inter-symbol interference (ISI), the Doppler effect due to mobility of a user equipment, etc. Therefore, various techniques have been developed to overcome the abnormal characteristic of the wireless channel and to increase reliability of wireless communication.

Multiple Input Multiple Output (MIMO) is a technique for supporting reliable high-speed data services. The MIMO technique improves data transmission/reception efficiency by using multiple transmit (Tx) antennas and multiple receive (Rx) antennas. Examples of the MIMO technique include spatial multiplexing, transmit diversity, beamforming, etc.

Multiple receive antennas and multiple transmit antennas form a MIMO channel matrix. A rank can be found from the MIMO channel matrix. The rank is the number of spatial layers. The rank may also be defined as the number of spatial streams which can be transmitted at the same time by a transmitter. The rank is also referred to as a spatial multiplexing ratio. Assuming that the number of transmit antennas is Nt and the number of receive antennas is Nr, the rank R is R≤min{Nt, Nr}.

A wireless communication system requires a signal known to both a transmitter and a receiver to perform channel measurement, information demodulation, or the like. The signal known to both the transmitter and the receiver is referred to as a reference signal (RS). The RS may also be referred to as a pilot.

The receiver may estimate a channel between the transmitter and the receiver by using the RS, and may demodulate information by using the estimated channel. When a user equipment receives an RS transmitted by a base station, the user equipment may measure a channel by using the RS, and may feed back channel state information to the base station.

A signal transmitted from the transmitter experiences a channel corresponding to each transmit antenna or each spatial layer, and thus the RS may be transmitted for each transmit antenna or each spatial layer. If the RS is transmitted for each spatial layer, a plurality of RSs have to be transmitted such that the RSs do not cause spatial interference to each other. There is a need to consider an RS transmission method capable of minimizing spatial interference between RSs.

Accordingly, there is a need for a method and apparatus for efficiently transmitting signals in a wireless communication system.

DISCLOSURE OF INVENTION

Technical Problem

The present invention provides a method and apparatus for transmitting signals in a wireless communication system.

Solution to Problem

In an aspect, a signal transmission apparatus is provided. The apparatus includes N antennas, a processor coupled to the N antennas and configured to generate N transmit signals by performing precoding on R spatial streams for R spatial layers, and to transmit the N transmit signals respectively through the N antennas, wherein an information stream, a reference signal sequence, and a reference signal pattern are allocated to each of the R spatial layers, and the reference signal pattern is a time-frequency resource pattern used for transmission of the reference signal sequence, wherein each of the R spatial streams corresponds to one spatial layer, and wherein each of the R spatial streams is generated based on the information stream, reference signal sequence, and reference signal pattern allocated to a corresponding spatial layer.

In another aspect, a signal transmission method in a wireless communication system is provided. The method includes generating N transmit signals by performing precoding on R spatial streams for R spatial layers and transmitting the N transmit signals respectively through the N antennas, wherein an information stream, a reference signal sequence, and a reference signal pattern are allocated to each of the R spatial layers, and the reference signal pattern is a time-frequency resource pattern used for transmission of the reference signal sequence, wherein each of the R spatial streams corresponds to one spatial layer, and wherein each of the R spatial streams is generated based on the information stream, reference signal sequence, and reference signal pattern allocated to a corresponding spatial layer.

Advantageous Effects of Invention

A method and apparatus for transmitting signals in a wireless communication system are provided. Accordingly, the overall performance of the system can be improved.

BRIEF DESCRIPTION OF DRAWINGS

FIG. 26 shows an exemplary case of using different RS patterns for super-RS identification.

FIG. 27 is a block diagram of an apparatus for wireless communications in which the embodiments of the present invention are implemented.

MODE FOR THE INVENTION

The technique described below can be used in various multiple access schemes such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advanced (LTE-A) is an evolution of the LTE.

For clarity, the following description will focus on the LTE(Release 8)/LTE-A(Release 10). However, the technical features of the present invention are not limited thereto.

Figure 1:
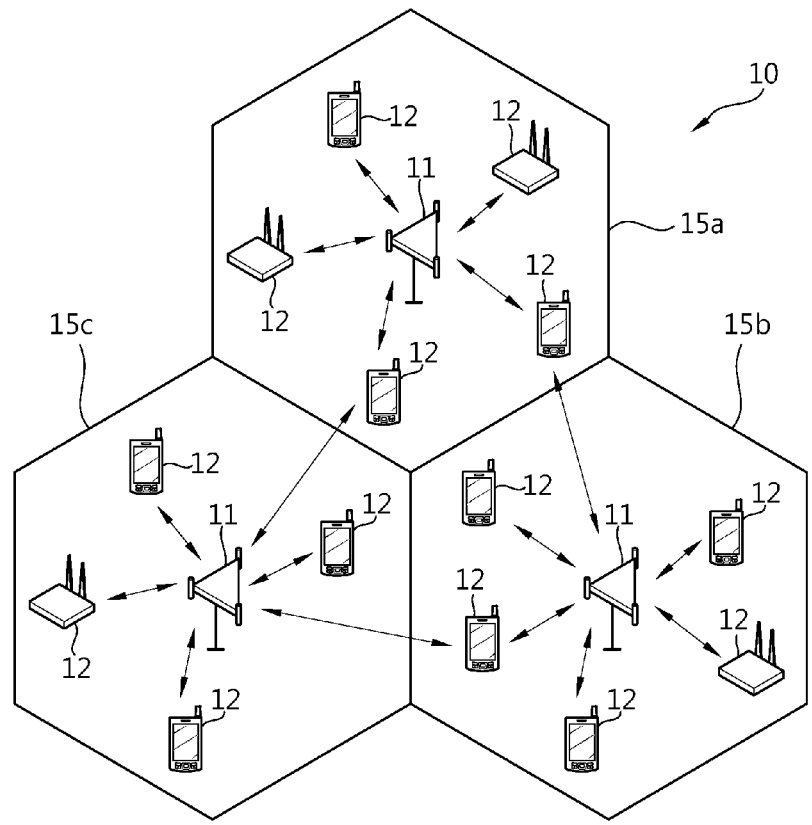
FIG. 1 is a block diagram showing a wireless communication system.

FIG. 1 is a block diagram showing a wireless communication system.

Referring to FIG. 1, a wireless communication system 10 includes at least one base station (BS) 11. The BSs 11 provide communication services to specific geographical regions (generally referred to as cells) 15*a*, 15*b*, and 15*c*. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes communication from the BS to the UE, and an uplink (UL) denotes communication from the UE to the BS. In the DL, a transmitter may be a part of the BS, and a receiver may be a part of the UE. In the UL, the transmitter may be a part of the UE, and the receiver may be a part of the BS.

The wireless communication system supports multi-antenna. The transmitter may use a plurality of transmit (Tx) antennas, and the receiver may use a plurality of receive (Rx) antennas. The Tx antenna is a logical or physical antenna used to transmit one signal or one stream, and the Rx antenna is a logical or physical antenna used to receive one signal or one stream. If the transmitter and the receiver use multi-antenna, the wireless communication system may be called as multiple input multiple output (MIMO) system.

A wireless communication process preferably is performed using a plurality of independent vertical layers rather than using a single layer. A structure having the plurality of vertical layers is referred to as a protocol stack. For the protocol stack, reference can be made to an open system interconnection (OSI) model which is a model for a widely known protocol structure in communication systems.

Figure 2:
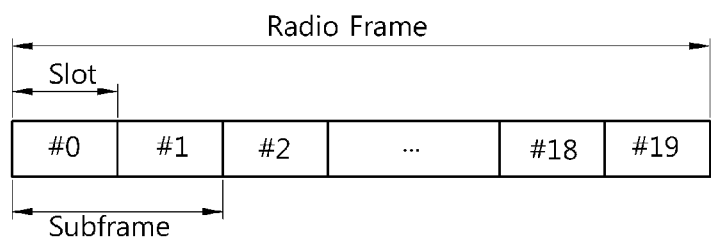
FIG. 2 shows an example of structure of a radio frame.

FIG. 2 shows an example of structure of a radio frame.

Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI is a scheduling unit for information transmission. For example, one radio frame may have a length of 10 milliseconds (ms), one subframe may have a length of 1 ms, and one slot may have a length of 0.5 ms. The structure of the radio frame is for exemplary purposes only, and thus the number of subframes included in the radio frame or the number of slots included in the subframe may change variously.

Figure 3:
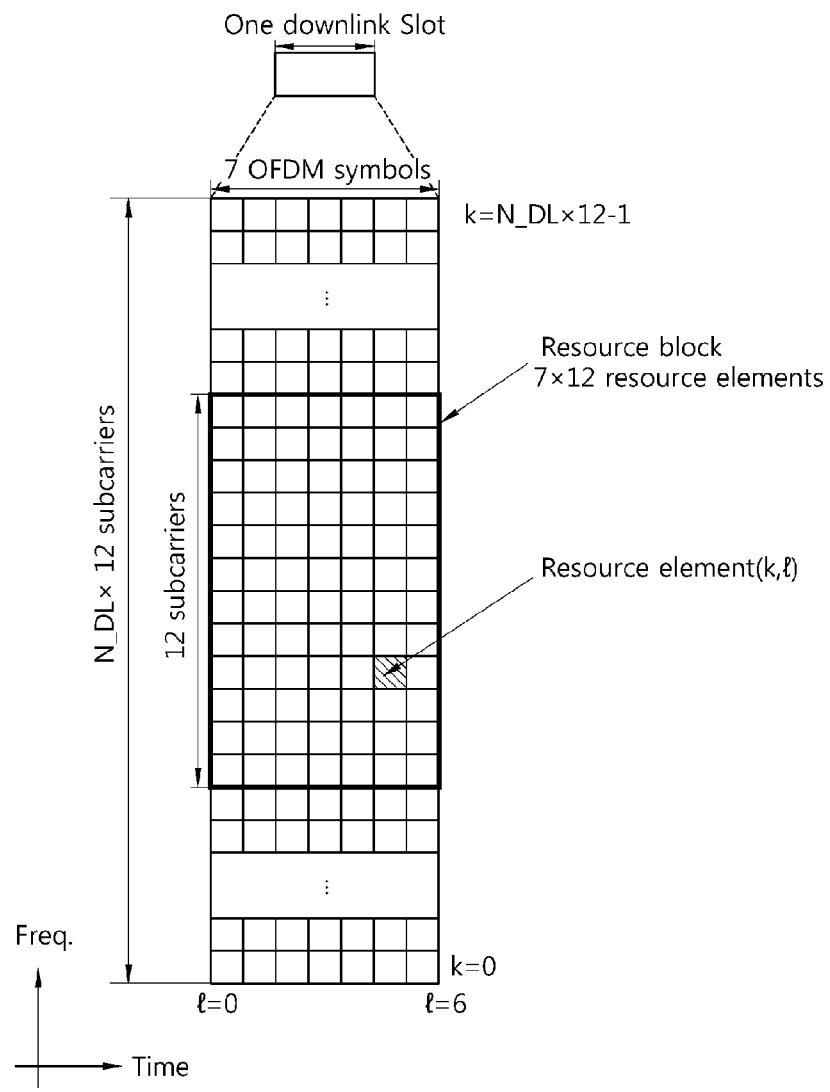
FIG. 3 shows an example of a resource grid for one downlink slot.

FIG. 3 shows an example of a resource grid for one downlink slot.

Referring to FIG. 3, the downlink slot includes a plurality of orthogonal frequency division multiplexing (OFDM) symbols in a time domain and N_DL resource blocks in a frequency domain. The OFDM symbol is for expressing one symbol period, and may be referred to as an OFDMA symbol or a SC-FDMA symbol according to a multiple access scheme. The number N_DL of resource blocks included in the downlink slot depends on a downlink transmission bandwidth configured in a cell. For example, in a 3GPP LTE system, N_DL may be any one value in the range of 6 to 110. One RB includes a plurality of subcarriers in the frequency domain.

Each element on the resource grid is referred to as a resource element. The resource element on the resource grid can be identified by an index pair (k, l) within the slot. Herein, k(k=0, . . . , N_DL×12−1) denotes a subcarrier index in the frequency domain, and l(l=0, . . . , 6) denotes an OFDM symbol index in the time domain.

Although it is described herein that one resource block includes 7×12 resource elements consisting of 7 OFDM symbols in the time domain and 12 subcarriers in the frequency domain for example, the number of OFDM symbols and the number of subcarriers in the resource block are not limited thereto. Thus, the number of OFDM symbols and the number of subcarriers may change variously depending on a cyclic prefix (CP) length, a subcarrier spacing, etc. For example, when using a normal CP, the number of OFDM symbols is 7, and when using an extended CP, the number of OFDM symbols is 6.

The resource grid for one downlink slot of FIG. 3 can be applied to a resource grid for an uplink slot.

Figure 4:
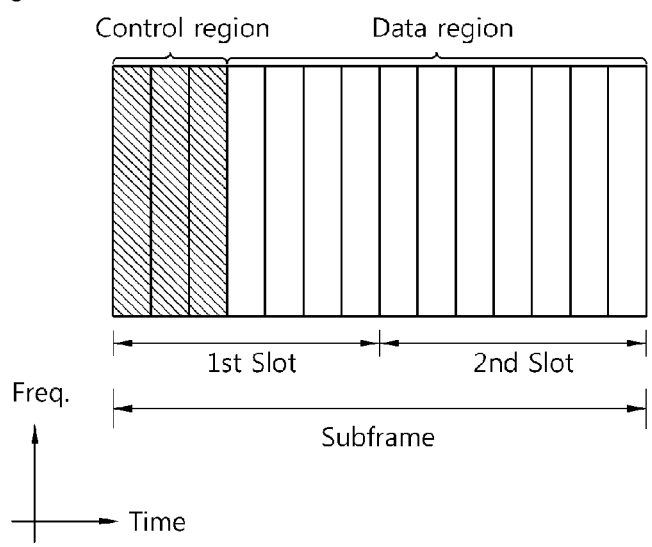
FIG. 4 shows an example of structure of a subframe.

FIG. 4 shows an example of structure of a subframe.

Referring to FIG. 4, the subframe includes two consecutive slots. Three OFDM symbols located in a front portion of a 1st slot in the subframe correspond to a control region. The remaining OFDM symbols correspond to a data region. Although the control region includes three OFDM symbols herein, this is for exemplary purposes only.

A physical downlink shared channel (PDSCH) can be assigned to the data region. Downlink data is transmitted on PDSCH.

Control channels such as a physical control format indicator channel (PCFICH), a physical HARQ (hybrid automatic repeat request) indicator channel (PHICH), a physical downlink control channel (PDCCH) etc., can be assigned to the control region.

The PCFICH carries information about the number of OFDM symbols used for transmission of PDCCHs in a subframe. The number of OFDM symbols used for PDCCH transmission may change in every subframe. The PHICH carries an HARQ acknowledgement (ACK)/not-acknowledgement (NACK) for uplink data.

The PDCCH carries downlink control information such as downlink scheduling information, uplink scheduling information, uplink power control command, or the like. The downlink scheduling information may be also referred to as a downlink grant, and the uplink scheduling information may be also referred to as an uplink grant.

The downlink grant may include a resource allocation field indicative of time-frequency resources for transmitting DL data, an MCS field indicative of a modulation coding scheme (MCS) level of the DL data, etc.

If a transmission scheme is multiple user-MIMO (MU-MIMO), a downlink grant may further include a power offset field. The power offset field indicates power offset information for obtaining downlink transmission energy for each resource element.

The transmission scheme is a scheme in which a base station (BS) transmits downlink data to a user equipment (UE). Examples of the transmission scheme include a single antenna scheme, a MIMO scheme, etc. The MIMO scheme includes a transmit diversity scheme, a spatial multiplexing scheme, a MU-MIMO system, etc. The transmission scheme may be semi-statically determined by using higher layer signaling such as radio resource control (RRC) signaling.

A wireless communication system requires a signal known to both a transmitter and a receiver to perform channel measurement, information demodulation, or the like. The signal known to both the transmitter and the receiver is referred to as a reference signal (RS). The RS may also be referred to as a pilot. The RS does not carry information derived from a higher layer, and may be generated in a physical layer.

When the RS is transmitted, the RS may be multiplied by a pre-determined RS sequence. The RS sequence may be a binary sequence or a complex sequence. For example, the RS sequence may use a pseudo-random (PN) sequence, an m-sequence, etc. However, this is for exemplary purposes only, and thus there is no particular restriction on the RS sequence. When the BS transmits the RS by multiplying the RS by the RS sequence, the UE can reduce interference acting on the RS by a signal of a neighbor cell. Accordingly, channel estimation capability can be improved.

The RS can be classified into a common RS and a dedicated RS.

The common RS is an RS transmitted to all UEs in a cell. All UEs in the cell may receive the common RS. To avoid inter-cell interference, the common RS may be determined in a cell-specific manner. In this case, the common RS is referred to as a cell-specific RS. The common RS may be used in channel estimation and information demodulation. An example of an RS used only for channel measurement includes a channel state information-RS (CSI-RS).

The dedicated RS is an RS received by a specific UE group or a specific UE in a cell.

The dedicated RS cannot be used by other UEs. The dedicated RS is also referred to as a UE-specific RS. The dedicated RS may be transmitted using a resource block allocated for downlink data transmission of the specific UE. The dedicated RS may be used in information demodulation.

Figure 5:
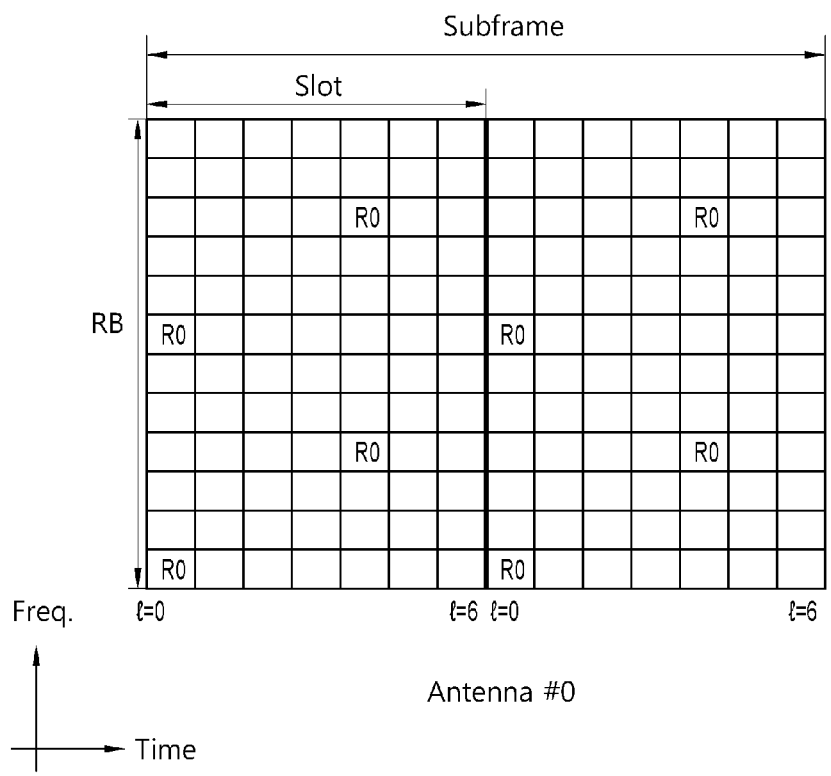
FIG. 5 shows exemplary mapping of a common RS for one antenna when using a normal CP.
Figure 6:
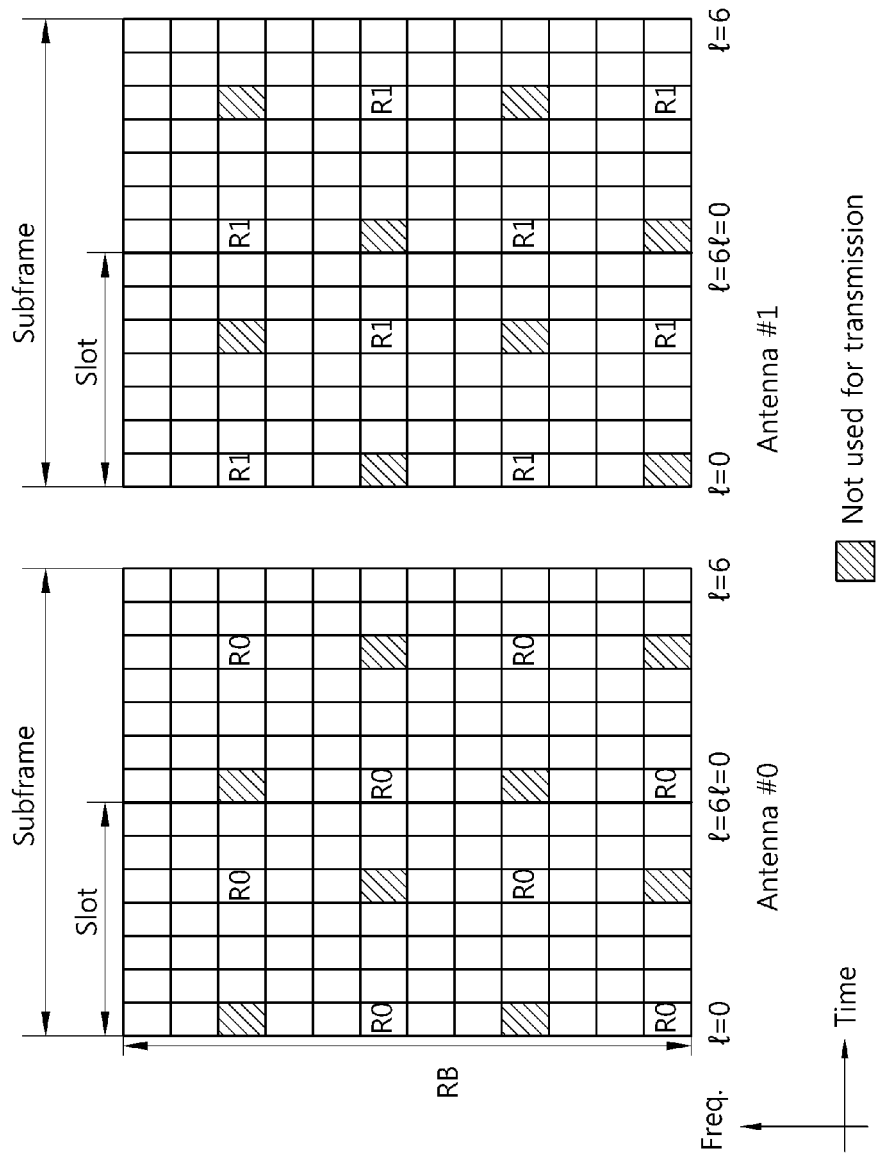
FIG. 6 shows exemplary mapping of common RSs for two antennas when using a normal CP.
Figure 7:
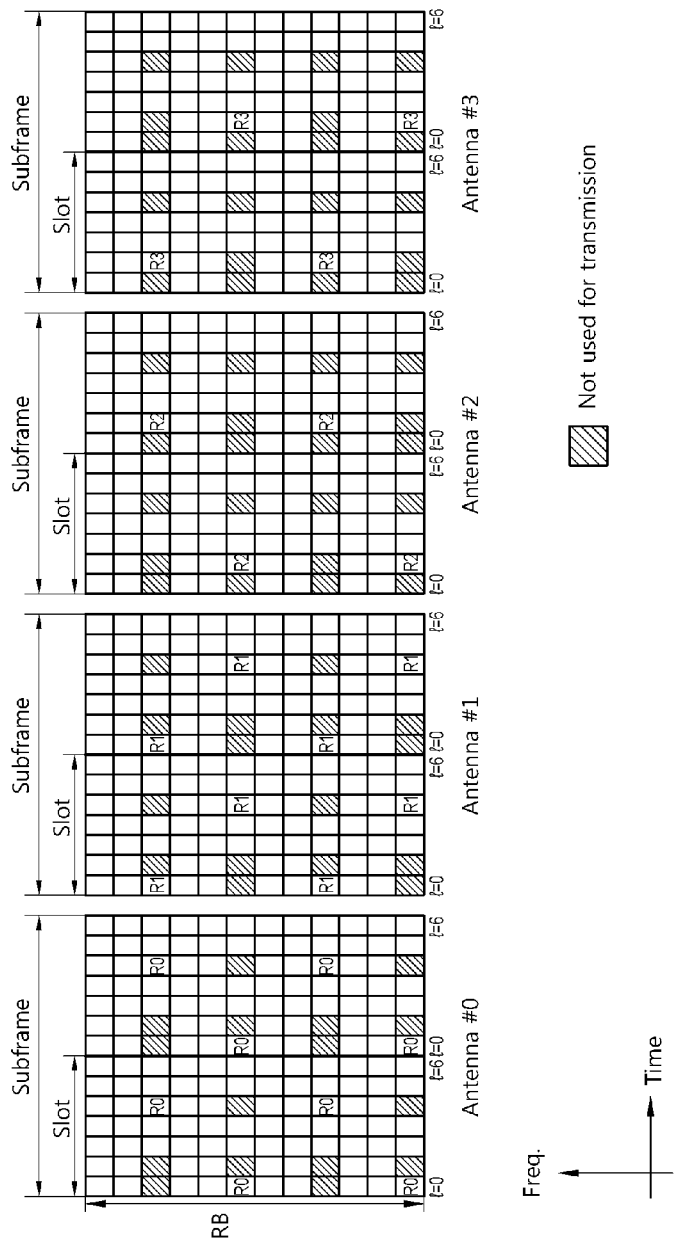
FIG. 7 shows exemplary mapping of common RSs for four antennas when using a normal CP.
Figure 8:
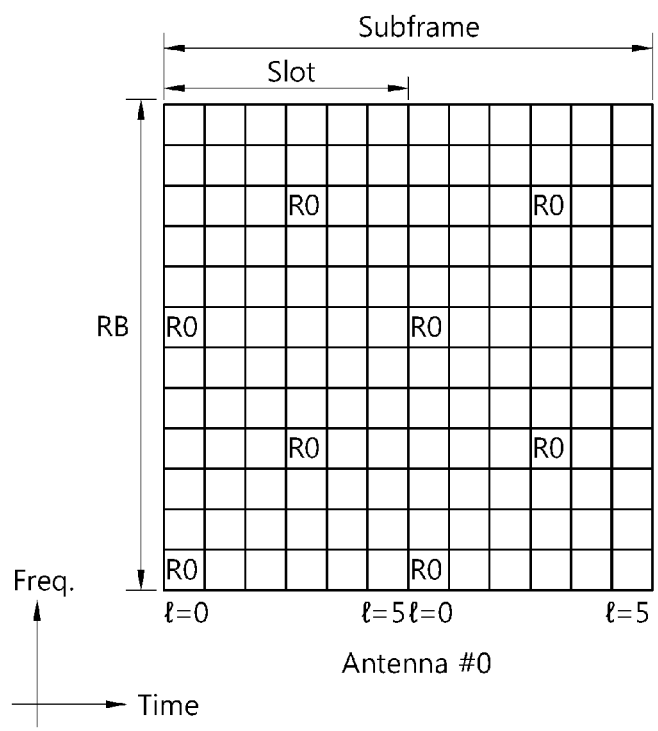
FIG. 8 shows exemplary mapping of a common RS for one antenna when using an extended CP.
Figure 9:
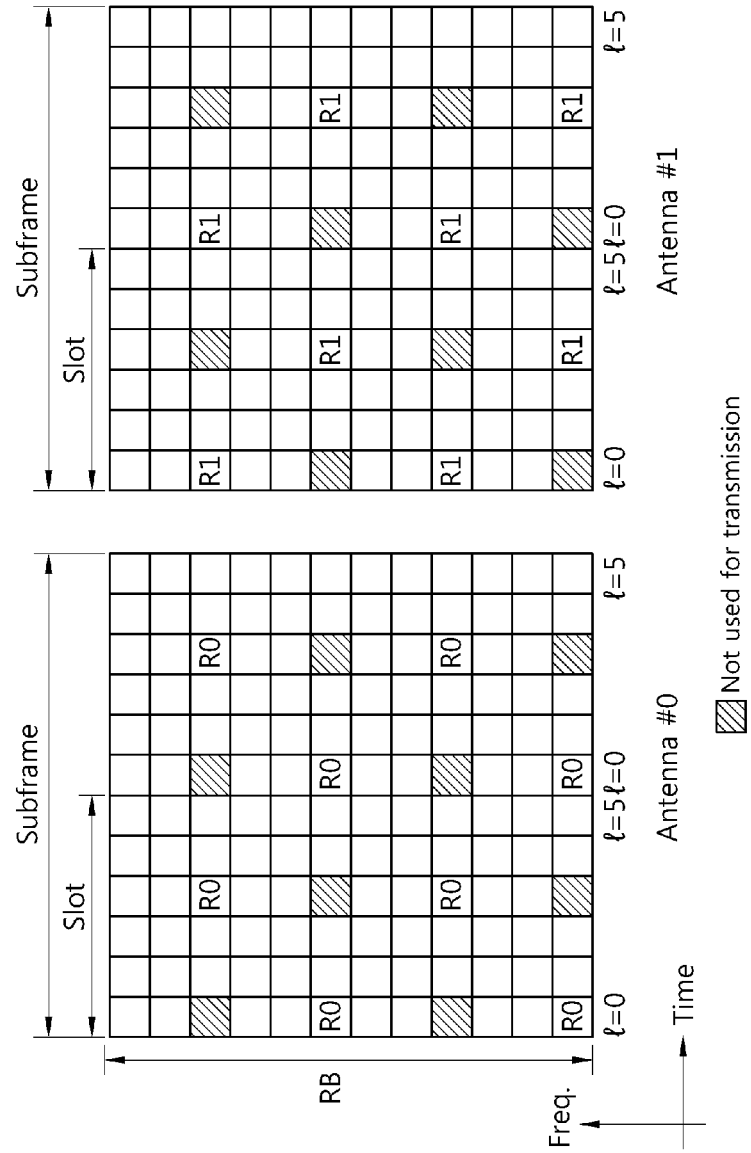
FIG. 9 shows exemplary mapping of common RSs for two antennas when using an extended CP.
Figure 10:
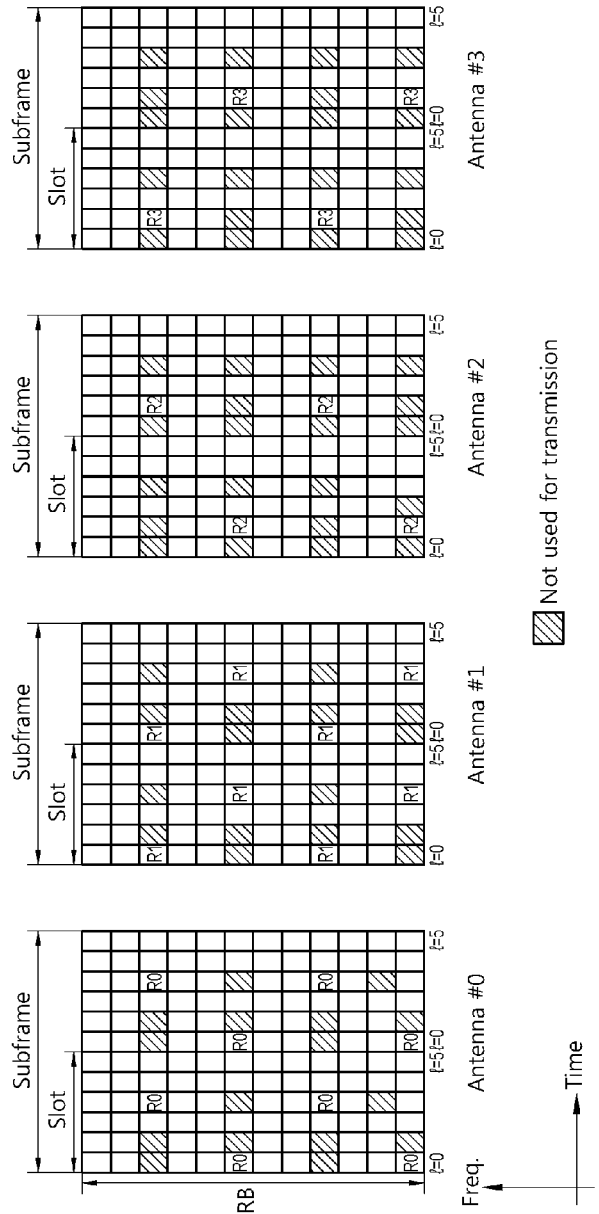
FIG. 10 shows exemplary mapping of common RSs for four antennas when using an extended CP.

FIG. 5 shows exemplary mapping of a common RS for one antenna when using a normal CP. FIG. 6 shows exemplary mapping of common RSs for two antennas when using a normal CP. FIG. 7 shows exemplary mapping of common RSs for four antennas when using a normal CP. FIG. 8 shows exemplary mapping of a common RS for one antenna when using an extended CP. FIG. 9 shows exemplary mapping of common RSs for two antennas when using an extended CP. FIG. 10 shows exemplary mapping of common RSs for four antennas when using an extended CP.

Referring to FIG. 5 to FIG. 10, Rp denotes a resource element used for RS transmission through an antenna #p (where p=0, 1, 2, 3). Hereinafter, the resource element used for RS transmission is referred to as a reference resource element. The resource element Rp is defined as a reference resource element for the antenna #p. The resource element Rp is used only for transmission through the antenna #p, and is not used for any other transmissions. In other words, a resource element used for RS transmission through a certain antenna in a subframe is not used for any other trans-missions through other antennas in the same subframe, and may be set to '0'. This is to avoid interference between antennas.

For convenience of explanation, a minimum unit of an RS pattern in a time-frequency resource is hereinafter referred to as a basic unit. The RS pattern determines a location of a reference resource element in a time-frequency resource. If the basic unit is extended to a time domain and/or a frequency domain, the RS pattern is iterated. Herein, the basic unit is one subframe in the time domain and one resource block in the frequency domain.

A common RS may be transmitted in every downlink subframe. One common RS is transmitted for each antenna. The common RS corresponds to a set of reference resource elements in a subframe. A BS may transmit the common RS by multiplying the common RS by a pre-defined common RS sequence.

An RS pattern of the common RS is referred to as a common RS pattern. Common RS patterns for the respective antennas are orthogonal to each other in the time-frequency domain. The common RS pattern is common to all UEs in a cell. The common RS sequence is also common to all UEs in the cell. However, to minimize inter-cell interference, each of the common RS pattern and the common RS sequence may be determined in a cell-specific manner.

The common RS sequence may be generated on an OFDM symbol basis in one subframe. The common RS sequence may differ according to a cell identifier (ID), a slot number in one radio frame, an OFDM symbol index in a slot, a CP length, etc.

In an OFDM symbol including a reference resource element in a basic unit, the number of reference resource elements for one antenna is 2. That is, in an OFDM symbol including the resource element Rp in the basic unit, the number of resource elements Rp is 2. A subframe includes N_DL resource blocks in the frequency domain. Therefore, in an OFDM symbol including the resource element Rp in the subframe, the number of resource elements Rp is 2×N_DL. Further, in the OFDM symbol including the resource element Rp in the subframe, a length of a common RS sequence for the antenna #p is 2×N_DL.

The following equation shows an example of a complex sequence r(m) generated for a common RS sequence in one OFDM symbol.

MathFigure 1

$$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N\_max, DL - 1$$
[Math. 1]

Herein, N_max,DL denotes the number of resource blocks corresponding to a maximum downlink transmission bandwidth supported in the wireless communication system. In an LTE, N_max,DL is 110. If N_DL is less than N_max,DL, a certain part of a length of 2×N_DL may be used as a common RS sequence by being selected from a complex sequence generated to have a length of 2×N_max,DL. c(i) denotes a PN sequence. The PN sequence can be defined by a gold sequence having a length of 31. The following equation shows an example of c(i).

MathFigure 2

$$c(n)=(x(n+Nc)-y(n+Nc)) \bmod 2 x(n+31)=(x(n+3)+x(n))$$
$$\bmod 2 y(n+31)=(y(n+3)+y(n+2)+x(n+1)+x(n))$$
$$\bmod 2$$
[Math.2]

Herein, Nc is 1600, x(i) is a first m-sequence, and y(i) is a second m-sequence. For example, the first m-sequence may be initialized to x(0)=1, x(i)=0 (i=1, 2, . . . , 30) in the beginning of each OFDM symbol. The second m-sequence may be initialized in the beginning of each OFDM symbol according to a cell ID, a slot number in a radio frame, an OFDM symbol index in a slot, a CP length, etc.

The following equation shows an example of initialization of the second m-sequence.

MathFigure 3

$$\sum_{i=0}^{30} y(i) \cdot 2^i =$$
$$2^{10}(7(n\_s + 1) + l + 1)(2N\_cell\_ID + 1) + 2N\_cell\_ID + N\_CP$$
[Math. 3]

Herein, n_s denotes a slot number in a radio frame, l denotes an OFDM symbol index in a slot, and N_cell_ID denotes a cell ID. In case of a normal CP, N_CP is 1. In case of an extended CP, N_CP is 0.

When the common RS sequence is generated according to the aforementioned equations, the common RS sequence is irrelevant to antennas. Therefore, if the common RS is transmitted for each of a plurality of antennas in the same OFDM symbol, each of the plurality of antennas uses the same common RS sequence.

The common RS sequence generated for each OFDM symbol including the reference resource element is mapped to the reference resource element according to a common RS pattern. The common RS sequence may be sequentially mapped to the reference resource element in an ascending order of a subcarrier index. In this case, the common RS sequence is generated for each antenna, and the common RS sequence is mapped to the reference resource element for each antenna.

Figure 11:
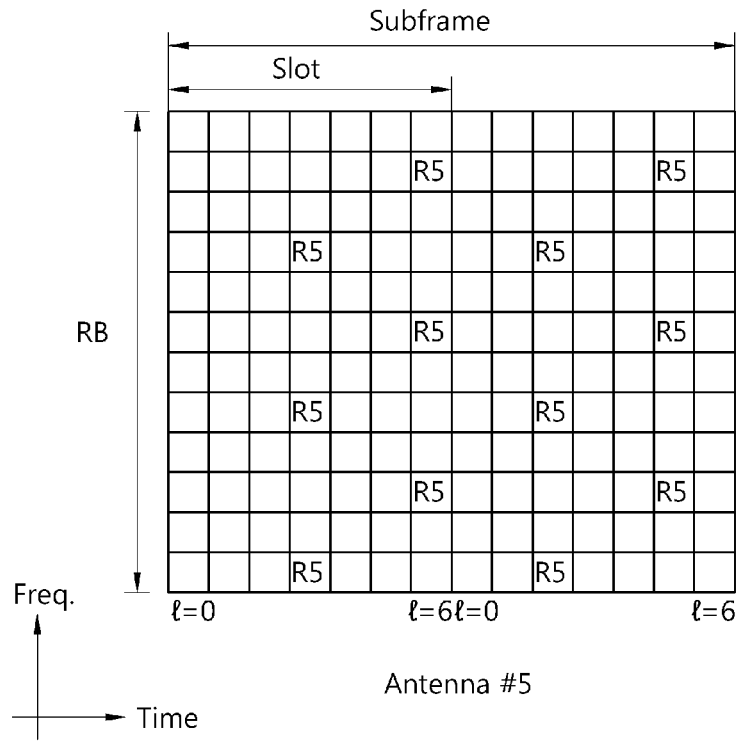
FIG. 11 shows exemplary mapping of a dedicated RS in an LTE when using a normal CP.
Figure 12:
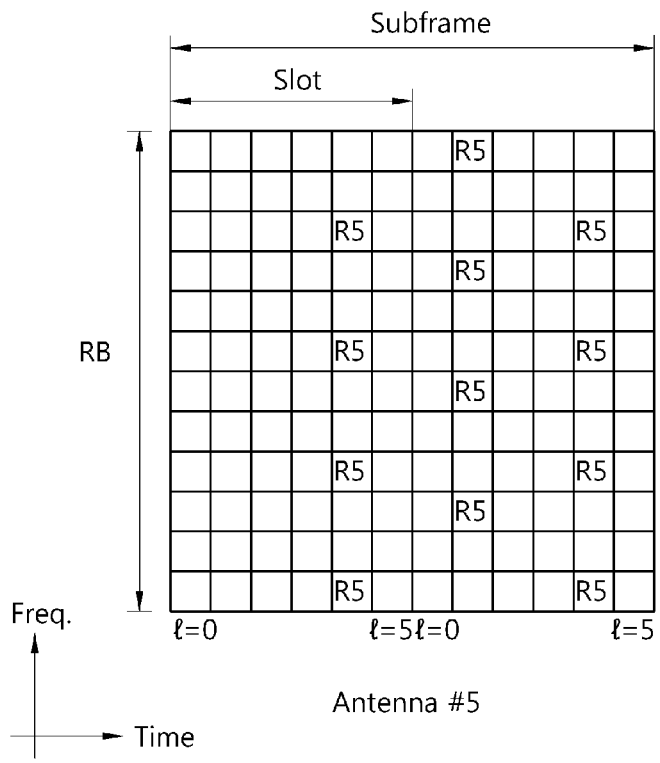
FIG. 12 shows exemplary mapping of a dedicated RS in an LTE when using an extended CP.

FIG. 11 shows exemplary mapping of a dedicated RS in an LTE when using a normal CP. FIG. 12 shows exemplary mapping of a dedicated RS in an LTE when using an extended CP.

Referring to FIG. 11 and FIG. 12, R5 denotes a resource element used for dedicated RS transmission through an antenna #5. In the LTE, the dedicated RS is supported for single antenna transmission. Only when single antenna transmission through the antenna #5 is determined by a higher layer as downlink data transmission over a PDSCH, the dedicated RS can exist and be useful for PDSCH demodulation. The dedicated RS may be transmitted only over a resource block to which the PDSCH is mapped. The dedicated RS corresponds to a set of reference resource elements in the resource block to which the PDSCH is mapped. A BS may transmit the dedicated RS by multiplying the dedicated RS by a pre-defined dedicated RS sequence. Herein, a basic unit is one subframe in a time domain and one resource block in a frequency domain.

The dedicated RS may be transmitted simultaneously with the common RS.

Therefore, an RS overhead becomes significantly greater in comparison with an RS overhead for a case where only the common RS signal is transmitted. A UE may use the common RS and the dedicated RS together. In a control region for transmitting control information in a subframe, the UE uses the common RS. In a data region existing in the subframe other than the control region, the UE may use the dedicated RS. For example, the control region consists of OFDM symbols of which an OFDM symbol index l is 0 to 2 in a first slot of the subframe (see FIG. 4).

A dedicated RS pattern is an RS pattern of a dedicated RS and may be common to all UEs in a cell. However, to minimize inter-cell interference, the dedicated RS pattern may be determined in a cell-specific manner. The dedicated RS sequence may be determined in a UE-specific manner. Therefore, only a specific UE in the cell can receive the dedicated RS.

The dedicated RS sequence may be generated on a subframe basis. The dedicated RS sequence may differ according to a cell ID, a subframe location in one radio frame, a UE ID, etc.

The number of reference resource elements for the dedicated RS in a basic unit is 12. That is, the number of resource elements R5 in the basic unit is 12. If N_PDSCH denotes the number of resource blocks to which the PDSCH is mapped, the total number of resource elements R5 for the dedicated RS is 12×N_PDSCH. Therefore, a length of the dedicated RS sequence is 12×N_PDSCH. The length of the dedicated RS sequence may differ according to the number of resource blocks allocated to the UE for PDSCH transmission.

The following equation shows an example of a dedicated RS sequence r(m).

MathFigure 4

$$r(m) = \frac{1}{\sqrt{2}}(1 - 2 \cdot c(2m)) + j\frac{1}{\sqrt{2}}(1 - 2 \cdot c(2m+1)), \quad \text{[Math. 4]}$$
$$m = 0, 1, \ldots, 12 \times N\_PDSCH - 1$$

Herein, c(i) denotes a PN sequence. c(i) may be determined by Equation 2 above. In this case, the second m-sequence may be initialized in the beginning of each subframe according to a cell ID, a subframe location in one radio frame, a UE ID, etc.

The following equation shows an example of initialization of the second m-sequence.

MathFigure 5

$$\sum_{i=0}^{30} y(i) \cdot 2^i = (\lfloor n\_s/2 \rfloor + 1) \cdot (2N\_cell\_ID + 1) \cdot 2^{16} + UE\_ID \quad \text{[Math. 5]}$$

Herein, n_s denotes a slot number in a radio frame, N_cell_ID denotes a cell ID, and UE_ID denotes a UE ID.

The dedicated RS sequence is mapped to the reference resource element according to the RS pattern in a resource block to which the PDSCH is mapped. In this case, the dedicated RS sequence is sequentially mapped in the resource block in an ascending order of a subcarrier, and is then mapped to a reference resource element in an ascending order of an OFDM symbol index.

Although the LTE supports the dedicated RS for single spatial stream or single antenna transmission as described above, an LTE-A also has to support the dedicated RS for multiple spatial stream or multiple antenna transmission. Therefore, there is a need to provide a method and apparatus for transmitting a dedicated RS for multiple spatial stream or multiple antenna transmission.

Hereinafter, a method and apparatus for transmitting information and a dedicated RS through multiple antennas will be described. The following description can also apply not only to the LTE-A system but alto to a conventional OFDM-MIMO system.

Figure 13:
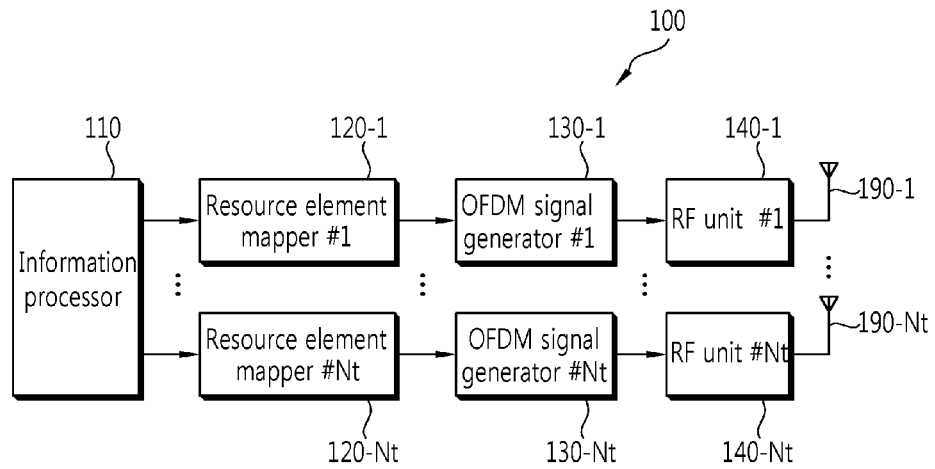
FIG. 13 is a block diagram showing an exemplary structure of a transmitter.

FIG. 13 is a block diagram showing an exemplary structure of a transmitter. The transmitter may be a part of a UE or a BS.

Referring to FIG. 13, a transmitter 100 includes an information processor 110, Nt resource element mappers 120-1, ..., 120-Nt, Nt OFDM signal generators 130-1, ..., 130-Nt, Nt radio frequency (RF) units 140-1, ..., 140-Nt, and Nt transmit antennas 190-1, ..., 190-Nt (where Nt is a natural number).

The information processor 110 is coupled to each of the Nt resource element mappers 120-1, ..., 120-Nt. The Nt resource element mappers 120-1, ..., 120-Nt are respectively coupled to the Nt OFDM signal generators 130-1, ..., 130-Nt. The Nt OFDM signal generators 130-1, ..., 130-Nt are respectively coupled to the Nt RF units 140-1, ..., 140-Nt. The Nt RF units 140-1, ..., 140-Nt are respectively coupled to the Nt transmit antennas 190-1, ..., 190-Nt. That is, a resource element mapper #n 120-n is coupled to an OFDM signal generator #n 130-n, the OFDM symbol generator #3 130-n is coupled to an RF unit #n 140-n, and the RF unit #n 140-n is coupled to a transmit antenna #n 190-n (where n=1, ..., Nt). In case of multiple antenna transmission, one resource grid is defined for each transmit antenna.

Information is input to the information processor 110. The information may be control information or data. The information may have a format of a bit or a bit-stream. The transmitter 100 can be implemented in a physical layer. In this case, the information may be derived from a higher layer such as a medium access control (MAC) layer.

The information processor 110 is configured to generate Nt transmit streams #1, #2, ..., #Nt from the information. Each of the Nt transmit streams includes a plurality of transmit symbols. The transmit symbol may be a complex-valued symbol obtained by processing the information.

The Nt resource element mappers 120-1, ..., 120-Nt are configured to receive the respective Nt transmit streams. That is, the resource element mapper #n 120-n is configured to receive a transmit stream #n. The resource element mapper #n 120-n is configured to map the transmit stream #n to resource elements in a resource block allocated for information transmission. Each transmit symbol of the transmit stream #n may be mapped to one resource element. '0' may be inserted to a resource element to which the transmit stream #n is not mapped.

One or more resource blocks may be allocated for information transmission. If a plurality of resource blocks are allocated, the plurality of resource blocks may be allocated either continuously or discontinuously.

Each of the Nt OFDM signal generators 130-1, ..., 130-Nt is configured to generate a time-continuous OFDM signal for each OFDM symbol. The time-continuous OFDM signal is also referred to as an OFDM baseband signal. Each of the Nt OFDM signal generators 130-1, ..., 130-Nt may generate an OFDM signal by performing inverse fast Fourier transform (IFFT), CP insertion, or the like on each OFDM symbol.

Each of the Nt RF units 140-1, ..., 140-Nt converts its OFDM baseband signal into a radio signal. The OFDM baseband signal may be converted into the radio signal by performing up-conversion at a carrier frequency. The carrier frequency is also referred to as a center frequency. The transmitter 100 may use either a single carrier or multiple carriers.

Radio signals are respectively transmitted through the Nt transmit antennas 190-1, ..., 190-Nt.

Figure 14:
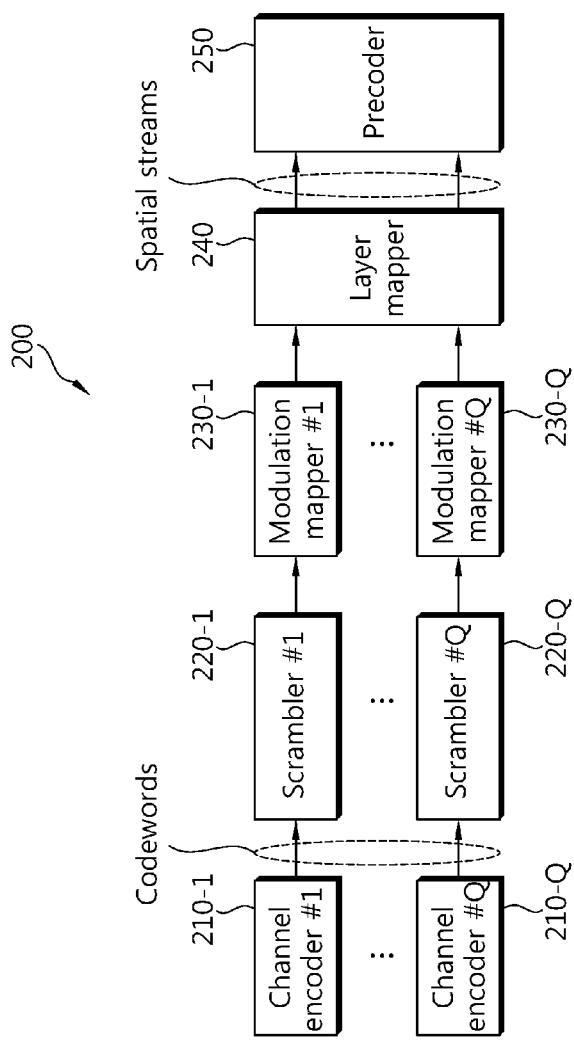
FIG. 14 is a block diagram showing an exemplary structure of an information processor of FIG. 13.

FIG. 14 is a block diagram showing an exemplary structure of an information processor of FIG. 13.

Referring to FIG. 14, an information processor 200 includes Q channel encoders 210-1, ..., 210-Q, Q scramblers 220-1, ..., 220-Q, Q modulation mappers 230-1, ..., 230-Q, a layer mapper 240, and a precoder 250.

The Q channel encoders 210-1, ..., 210-Q are respectively coupled to the Q scramblers 220-1, ..., 220-Q. The Q scramblers 220-1, ..., 220-Q are respectively coupled to the plurality of modulation mappers 230-1, ..., 230-Q. The plurality of modulation mappers 230-1, ..., 230-Q are coupled to the layer mapper 240. The layer mapper 240 is coupled to the precoder 250.

The precoder 250 is coupled to Nt resource element mappers (seep FIG. 5). That is, a channel encoder #q 210-q is coupled to a scrambler #q 220-q, and the scrambler #q 220-q is coupled to a modulation mapper #q 230-1 (where q=1, ..., Q).

Each of the Q channel encoders 210-1, ..., 210-Q is configured to receive information bit, and to generate an encoded bit by performing channel coding on the information bit. The information bit corresponds to information to be transmitted by a transmitter. A size of the information bit may be various according to the information. A size of the encoded bit may also be various according to the size of the information bit and a channel coding scheme. There is no restriction on the channel coding scheme. Examples of the channel coding scheme may include turbo coding, convolution coding, block coding, etc. An encoded bit obtained by performing channel coding on the information bit is referred to as a codeword. Herein, Q denotes the number of codewords. The channel encoder #q 210-*q* outputs a codeword #q (where q=1, . . . , Q).

Each of the Q scramblers 220-1, . . . , 220-Q is configured to generate a scrambled bit for each codeword. The scrambled bit is generated by scrambling the encoded bit with a scrambling sequence. The scrambler #q 220-*q* is configured to generate a scrambled bit for the codeword #q (where q=1, . . . , Q).

Each of the Q modulation mappers 230-1, . . . , 230-Q is configured to generate a modulation symbol for each codeword. The modulation symbol may be complex-valued symbol. The modulation mapper #q 230-1 is configured to generate a modulation symbol by mapping the scrambled bit for the codeword #q to a symbol for representing a location on a signal constellation (where q=1, . . . , Q). There is no restriction on a modulation scheme. For example, the modulation scheme may be m-phase shift keying (PSK) or m-quadrature amplitude modulation (QAM). The number of modulation symbols output from the modulation mapper #q 230-1 for the codeword #q may be various according to a size of the scrambled bit and the modulation scheme.

The layer mapper 240 is configured to map a modulation symbol for each codeword to R spatial layers. The modulation symbol may be mapped to the spatial layers in various manners. R spatial streams are generated as a result. Herein, R denotes a rank. The rank R may be equal to or greater than the number of codewords.

The precoder 250 is configured to generate Nt transmit streams by performing precoding on the R spatial streams. The number Nt of transmit antennas is equal to or less than the rank R.

The Nt transmit streams generated by the precoder 250 are respectively input to the Nt resource element mappers (see FIG. 5). The Nt transmit streams are respectively transmitted through the Nt transmit antennas. That is, a transmit stream #n is input to a resource element mapper #n, and is transmitted through a transmit antenna #n (where n=1, 2, . . . , Nt).

As such, a MIMO scheme in which multiple spatial streams are simultaneously transmitted through a plurality of transmit antennas is referred to as spatial multiplexing. The spatial multiplexing includes single-user spatial multiplexing and multi-user spatial multiplexing. The single-user spatial multiplexing is referred to as single user (SI)-MIMO. The multi-user spatial multiplexing is referred to as multi user (MU)-MIMO. The MU-MIMO can be supported in both uplink and downlink.

In case of the SU-MIMO, a plurality of spatial layers are all allocated to one UE. Through the plurality of spatial layers allocated to one UE, the multiple spatial streams are transmitted by using the same time-frequency resource.

In case of the MU-MIMO, a plurality of spatial layers are allocated to a plurality of UEs. The multiple spatial streams allocated to the plurality of UEs are transmitted by using the same time-frequency resource. A different spatial layer is allocated to a different UE. If R denotes a rank, R spatial streams can be allocated to K UEs (where 2≤K≤R, and K is a natural number). Each of the K UEs simultaneously shares a time-frequency resource used for multiple spatial stream transmission.

A dedicated RS for multiple antenna transmission may be either a precoded RS or a non-precoded RS.

The non-precoded RS is an RS which is always transmitted by the number of transmit antennas irrespective of the number of spatial layers. The non-precoded RS has an independent RS for each transmit antenna. In general, the common RS is the non-precoded RS. This is because a precoder is generally used for a specific UE. However, if a cell-specific precoder exists in a specific system, virtualization is considered rather than precoding.

The precoded RS is an RS which is transmitted by the number of spatial layers. The precoded RS has an independent RS for each spatial layer.

Figure 15:
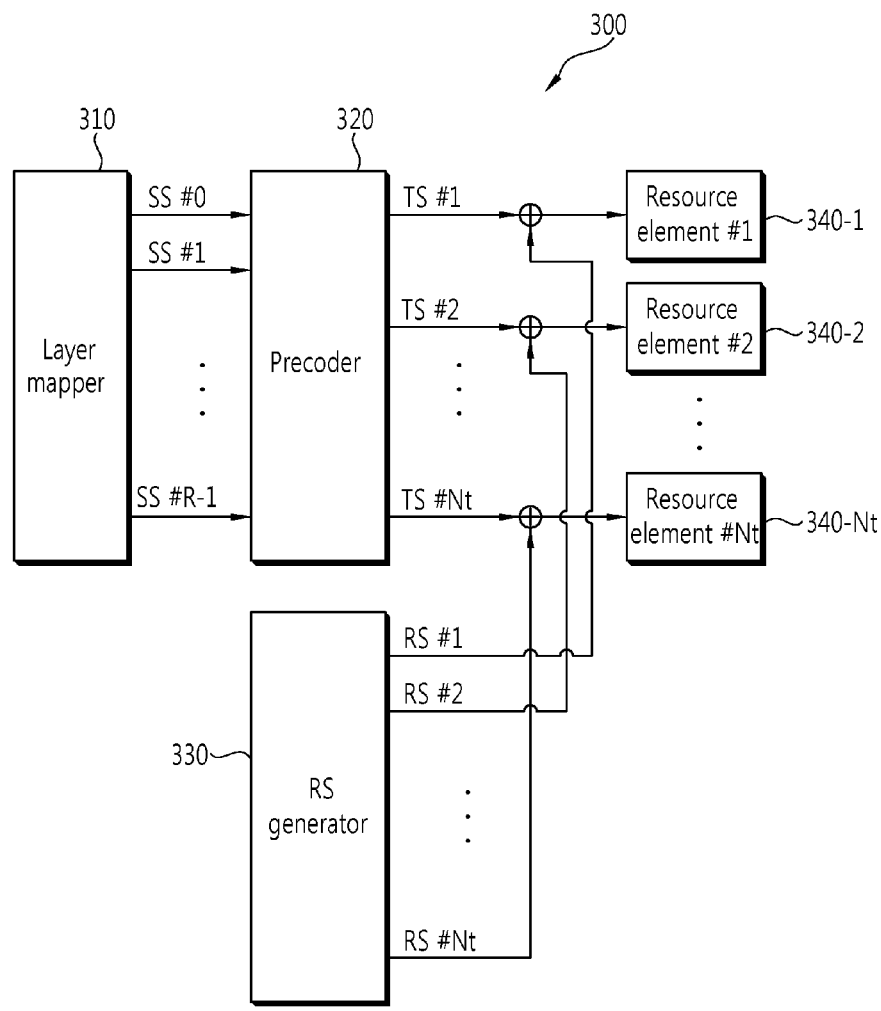
FIG. 15 is a block diagram showing an exemplary structure of a transmitter for generating a non-precoded dedicated RS.

FIG. 15 is a block diagram showing an exemplary structure of a transmitter for generating a non-precoded dedicated RS.

Referring to FIG. 15, a transmitter 300 includes a layer mapper 310, a precoder 320, an RS generator 330, and Nt resource element manners 340-1, . . . , 340-Nt. Herein, Nt denotes the number of transmit antennas of the transmitter 300. Although not shown in FIG. 15, the structures of FIG. 13 and FIG. 14 may be used by reference in the description of the structure of the transmitter 300. It is assumed that the number of spatial layers is R.

The layer mapper 310 is coupled to the precoder 320. Each of the precoder 320 and the RS generator 330 is coupled to the Nt resource element manners 340-1, . . . , 340-Nt.

The layer mapper 310 is configured to generate R spatial streams SS #0, SS #1, . . . , SS #R−1 for the R spatial layers.

The precoder 320 is configured to generate Nt transmit streams TS #1, TS #2, . . . , TS #Nt by performing precoding on the R spatial streams.

The RS generator 330 generates an RS sequence in association with an RS. The RS sequence consists of a plurality of reference symbols. Any sequence may be used for the RS sequence, without any particularly restriction.

The RS generator 330 is configured to generate an RS sequence for each of the Nt transmit antennas. The RS generator 330 is configured to generate Nt RS sequences RS #1, RS #2, . . . , RS #Nt. Each of the Nt RS sequences includes a plurality of RS symbols. The RS symbol may be a complex-valued symbol.

Each of the Nt resource element manners 340-1, . . . , 340-Nt is configured to receive a transmit stream and an RS sequence and to map the transmit stream and the RS sequence to resource elements. A resource element mapper #n 340-*n* may receive a TS #n and an RS #n and map them to resource elements (where n=1, 2, . . . , Nt).

Figure 16:
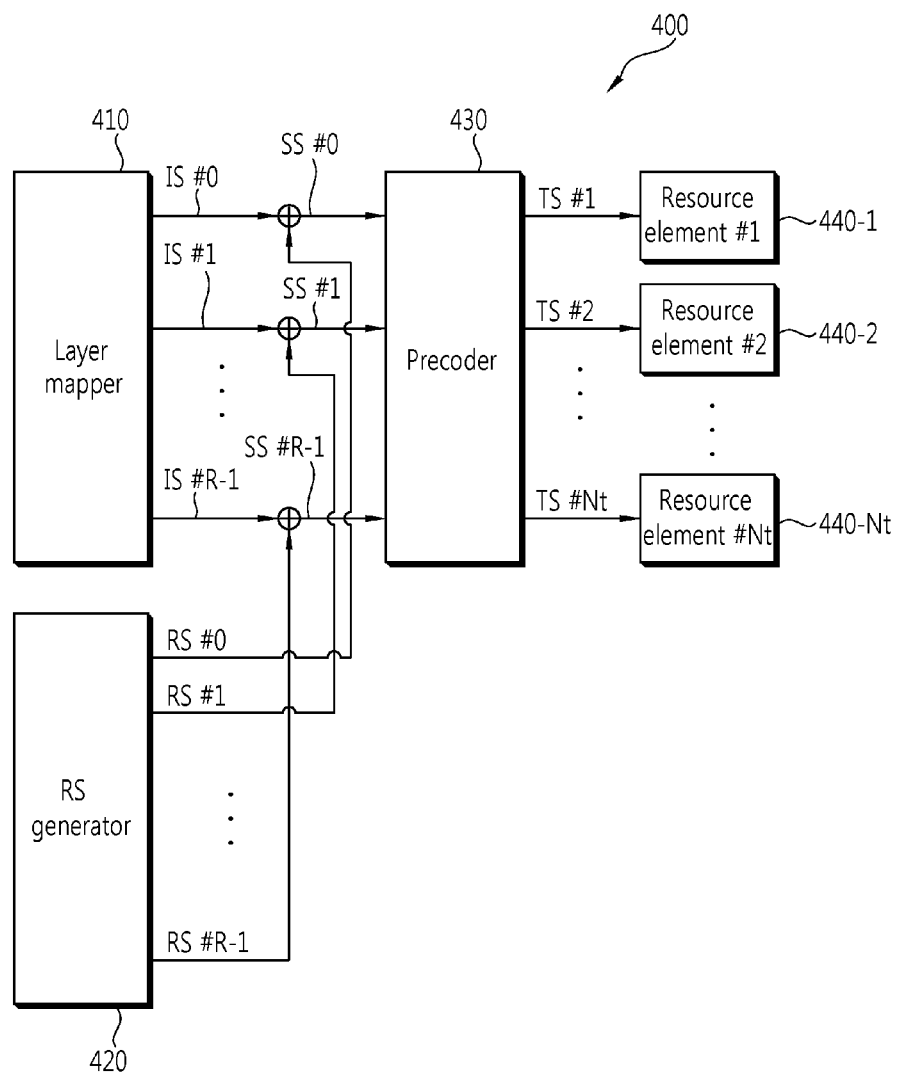
FIG. 16 is a block diagram showing an exemplary structure of a transmitter for generating a precoded dedicated RS.

FIG. 16 is a block diagram showing an exemplary structure of a transmitter for generating a precoded dedicated RS.

Referring to FIG. 16, a transmitter 400 includes a layer mapper 410, an RS generator 420, a precoder 430, and Nt resource element mappers 440-1, . . . , 440-Nt. Herein, Nt denotes the number of transmit antennas of the transmitter 400. Although not shown in FIG. 16, the structures of FIG. 13 and FIG. 14 may be used by reference in the description of the structure of the transmitter 400. It is assumed that the number of spatial layers is R.

Each of the layer mapper 410 and the RS generator 420 is coupled to the precoder 430. The precoder 430 is coupled to the Nt resource element mappers 440-1, . . . , 440-Nt. The layer mapper 410 is configured to generate R information streams. The R information streams can be expressed by IS #0, IS #1, . . . , IS #R−1.

The RS generator 420 is configured to generate R RS sequences. The R RS sequences can be expressed by RS #0, RS #1, . . . , RS #R−1. Each of the R RS sequences includes a plurality of RS symbols. The RS symbol may be a complex-valued symbol.

An information stream, an RS sequence, and an RS pattern are allocated to each of the R spatial layers. An IS #r and an RS #r are allocated to a spatial layer #r (where r=0, 1, ..., R−1). Herein, r denotes a spatial layer index indicating a spatial layer. An RS pattern allocated to the spatial layer #r is a time-frequency resource pattern used for RS #r transmission.

The precoder 430 is configured to generate Nt transmit streams by performing precoding on R spatial streams. The R spatial streams can be expressed by SS #0, SS #1, ..., SS #R−1. The Nt transmit streams can be expressed by TS #1, TS #2, ..., TS #Nt.

Each of the R spatial streams corresponds to one spatial layer. That is, an SS #r corresponds to a spatial layer #r (where r=0, 1, ..., R−1). Each of the R spatial streams is generated based on an information stream, RS sequence, RS pattern allocated to a corresponding spatial layer. That is, the SS #r is generated based on an RS pattern allocated to the IS #r, the RS #r, and the spatial layer #r.

Each of the R spatial streams includes a plurality of spatial symbols. The spatial symbol may be a complex-valued symbol. A spatial symbol #k of the SS #r can be expressed by $x_r(k)$ (where r=0, 2, ..., R−1). The spatial symbol #k of the R spatial streams can be expressed by a spatial symbol vector $x(k)=[x_1(k) \ x_2(k) \ ... \ x_R(k)]^T$. Herein, $[\cdot]^T$ denotes a transposed matrix of $[\cdot]$, and k denotes a time-frequency resource index indicating a time-frequency resource by which a spatial symbol vector is transmitted. For example, the time-frequency resource indicated by k may be a subcarrier or a resource element.

$x_r(k)$ is determined according to an RS pattern allocated to the spatial layer #r. $x_r(k)$ may be an information symbol of the SS #r or an RS symbol of the RS #r according to the RS pattern. Alternatively, $x_r(k)$ may be set to '0'. As such, each of the R spatial streams is generated based on an information stream, RS sequence, and RS pattern allocated to a corresponding spatial layer.

The precoder 430 may perform precoding according to the following equation.

MathFigure 6

$$y(k)=W \cdot x(k) \quad \text{[Math.6]}$$

Herein, $y(k)=[y_1(k) \ y_2(k) \ ... \ y_{Nt}(k)]^T$ denotes a transmit symbol vector, W denotes a precoding matrix with a size of Nt×R, and $x(k)=[x_1(k) \ x_2(k) \ ... \ x_R(k)]^T$ denotes a spatial symbol vector. Nt denotes the number of transmit antennas, and R denotes a rank. If the rank is 1 (i.e., R=1), the precoding matrix is a column vector. In general, a matrix conceptually includes a row vector as well as the column vector.

The precoding matrix W can be expressed by the following equation.

MathFigure 7

$$W = (w_0 \ w_1 \ ... \ w_{R-1}) = \begin{pmatrix} w_{01} & w_{11} & ... & w_{(R-1)1} \\ w_{02} & w_{12} & ... & w_{(R-1)2} \\ \vdots & \vdots & \ddots & \vdots \\ w_{0Nt} & w_{1Nt} & ... & w_{(R-1)Nt} \end{pmatrix} \quad \text{[Math. 7]}$$

Herein, $w_i$ is an $i^{th}$ column vector of the precoding matrix W (where i=0, ..., R−1).

In case of the MU-MIMO, the R spatial layers are allocated to K UEs (where 2≤K≤R, and K is a natural number). In case of the MU-MIMO, the precoding matrix may be a MU-MIMO precoding matrix. If W is the MU-MIMO precoding matrix, a BS may configure $w_i$ by reconfiguring channel state information (CSI) which is fed back from each of the K UEs. Alternatively, the BS may randomly configure w, by using the CSI which is fed back from each of the K UEs. The CSI denotes general information on a downlink channel. There is no particular restriction on the CSI. The CSI may include at least one of a channel quality indicator (CQI), a precoding matrix indicator (PMI), and a rank indicator (RI). The CQI indicates a modulation and coding scheme (MCS) level suitable for a channel. The PMI indicates a precoding matrix suitable for the channel. The RI indicates a rank of the channel.

As such, when a precoded RS is used, an RS symbol of an RS sequence for each spatial layer is precoded and transmitted together with an information symbol of an information stream.

However, if the precoded RS is transmitted, RSs for respective spatial layers do not have to cause spatial interference to each other. In particular, in case of the MU-MIMO, the RSs have to be transmitted such that RS interference between multiple users is minimized.

To avoid interference between RSs for each spatial layer, frequency division multiplexing (FDM), time division multiplexing (TDM), and/or code division multiplexing (CDM) may be used. In the FDM, an RS for each spatial layer is transmitted by being divided in a frequency domain. In the TDM, the RS for each spatial layer is transmitted by being divided in a time domain. In the CDM, the RS for each spatial layer is transmitted by using another RS sequence.

First, the FDM and/or the TDM will be described. To transmit the precoded RS, a plurality of RS patterns may be configured. The plurality of RS patterns may be configured by using frequency shift and/or time shift.

A. Frequency Shift

Each of a plurality of RS patterns may be an RS pattern which is frequency-shifted from a basic RS pattern. Each of the plurality of RS patterns may be an RS pattern in which the basic RS pattern is cyclic-shifted by an m-subcarrier in a frequency domain (where m is an integer other than a negative integer).

A different RS pattern may be allocated to each of the R spatial layers. In doing so, RSs for the respective spatial layers may not cause spatial interfere to each other. In case of the MU-MIMO, a different RS pattern may be allocated to each UE.

Figure 17:
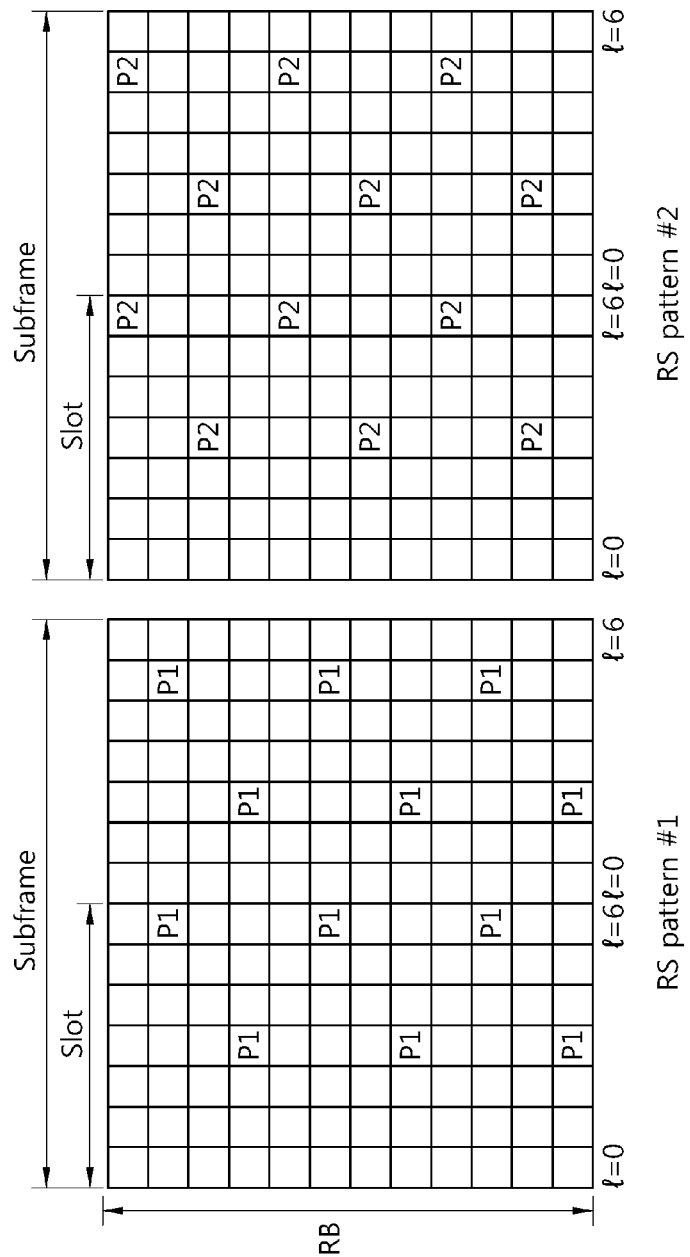
FIG. 17 and FIG. 18 show examples of configuring a plurality of RS patterns by using frequency shift.
Figure 18:
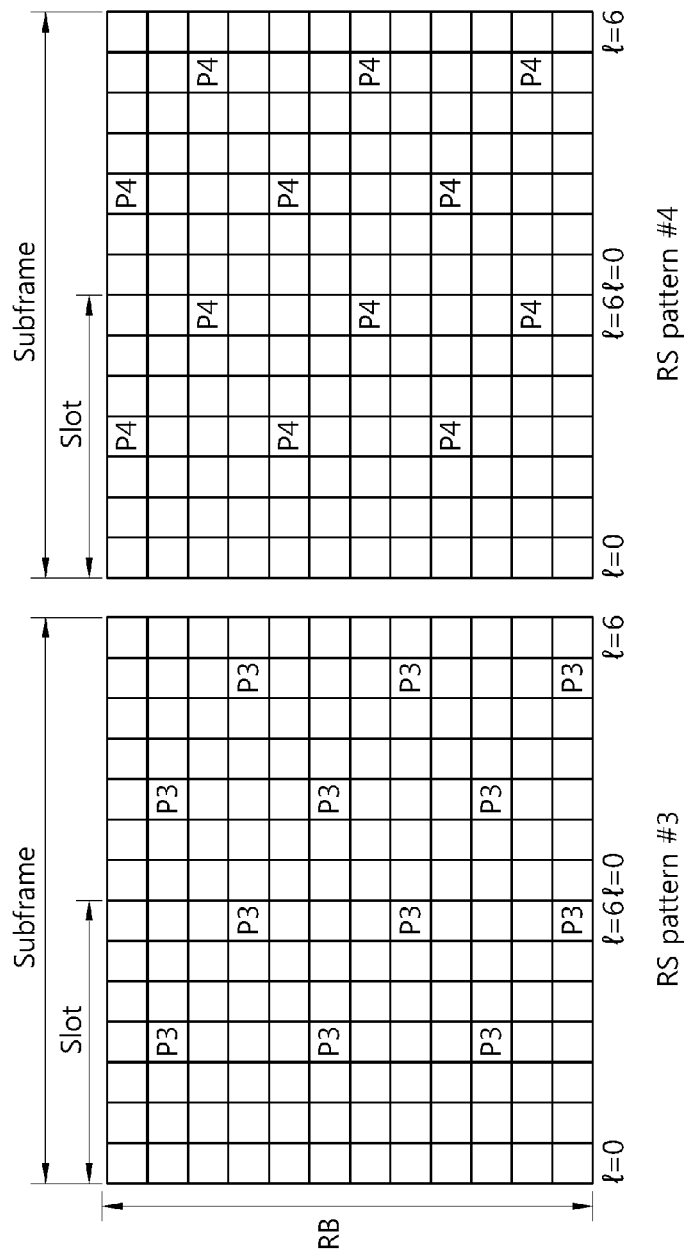
Figure 19:
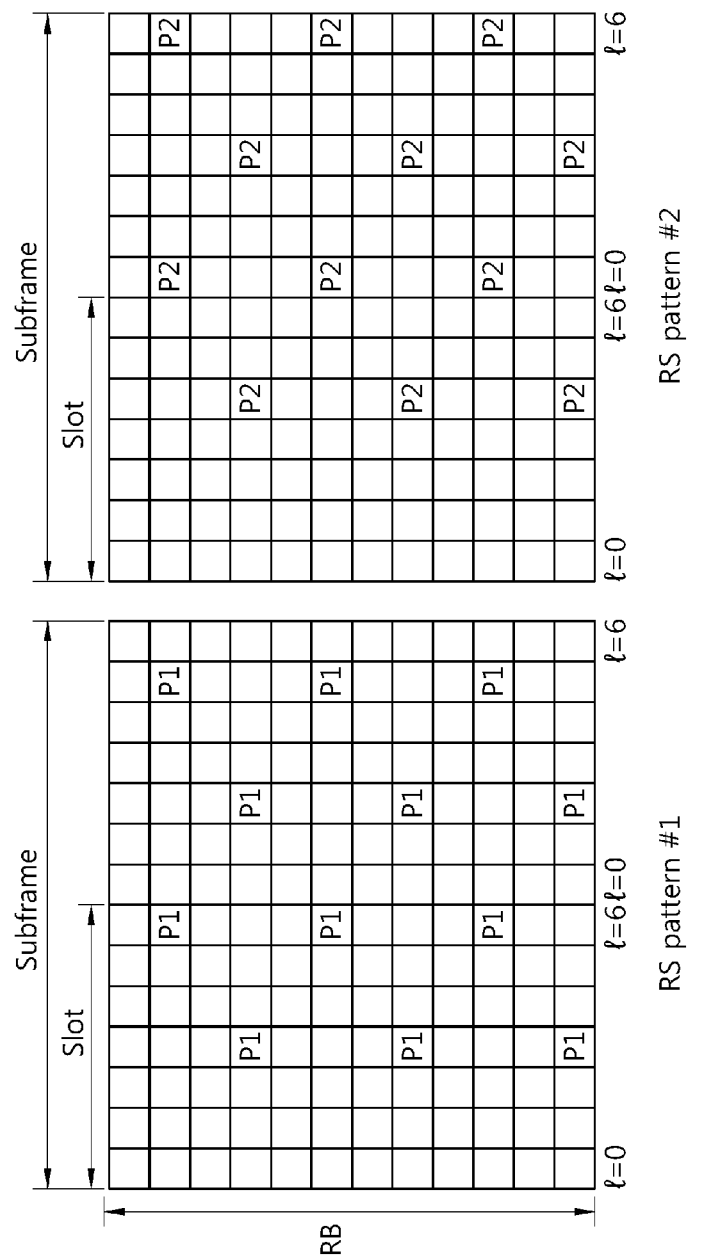
FIG. 19 to FIG. 24 show examples of configuring a plurality of RS patterns by using time shift.
Figure 20:
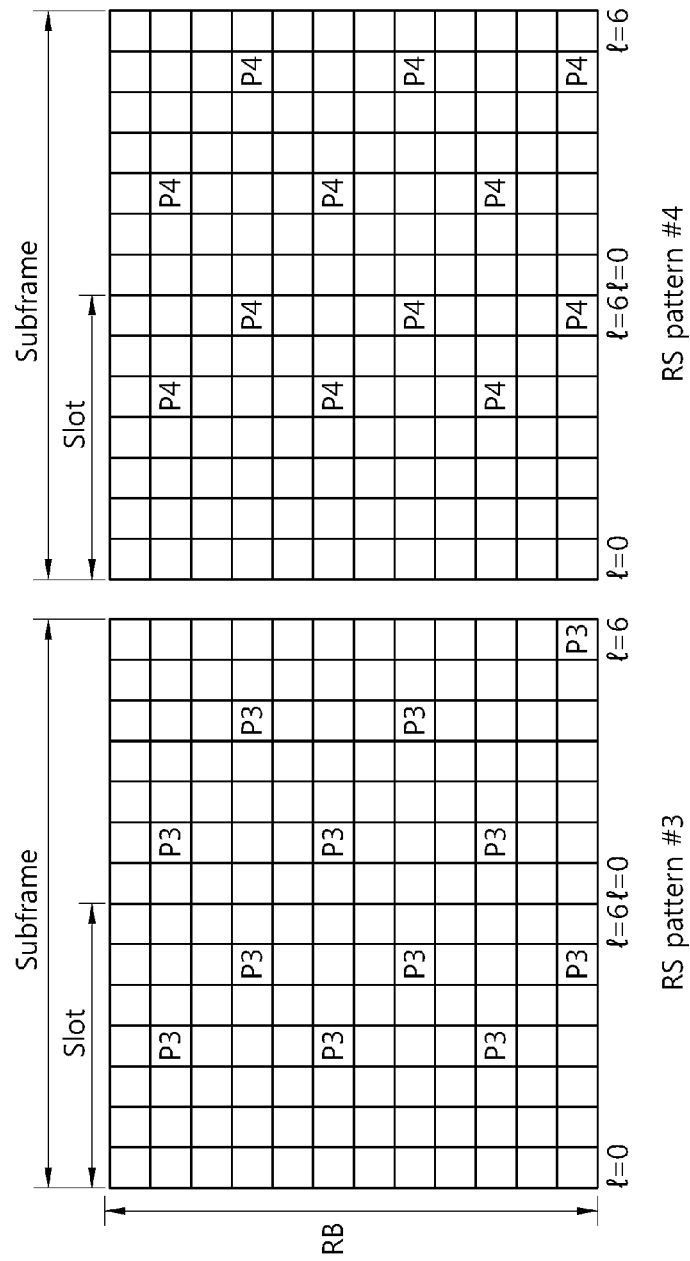
Figure 21:
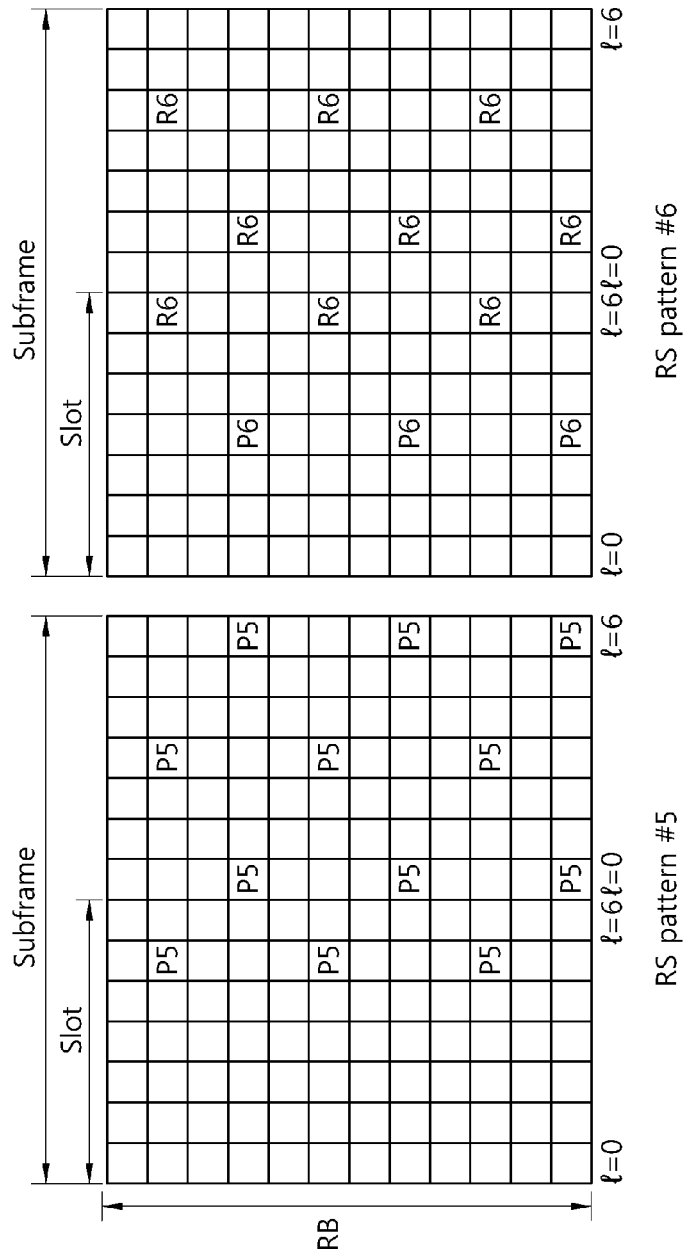
Figure 22:
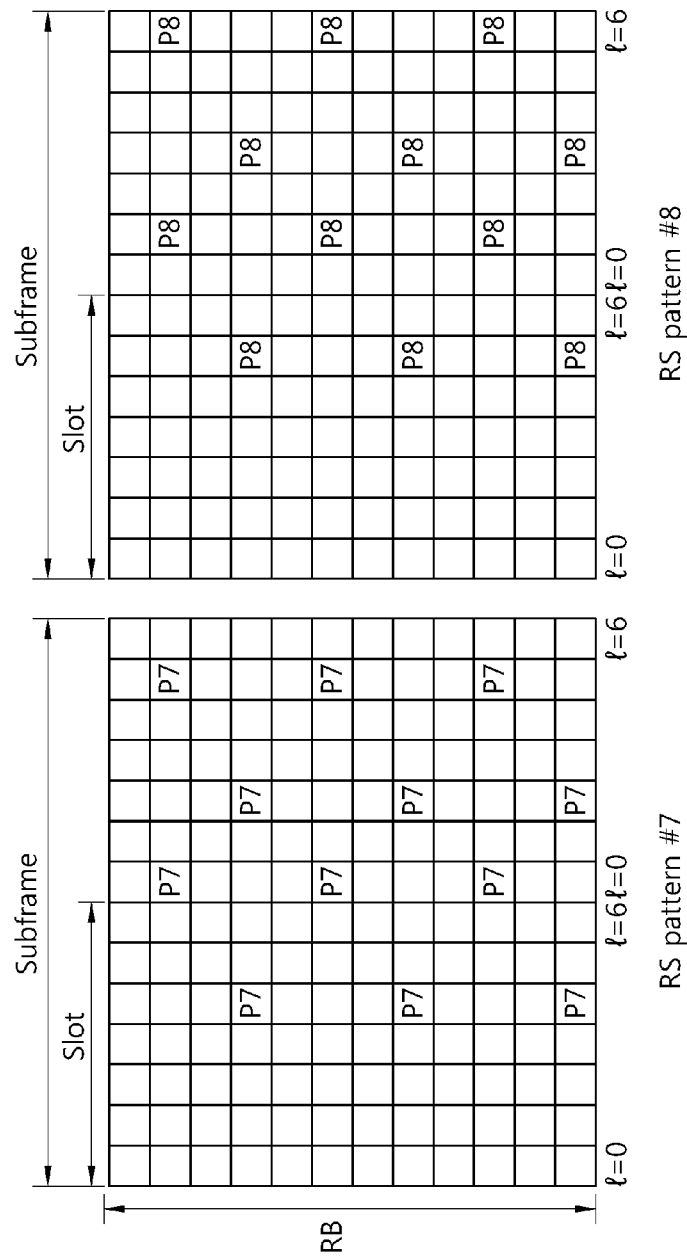
Figure 23:
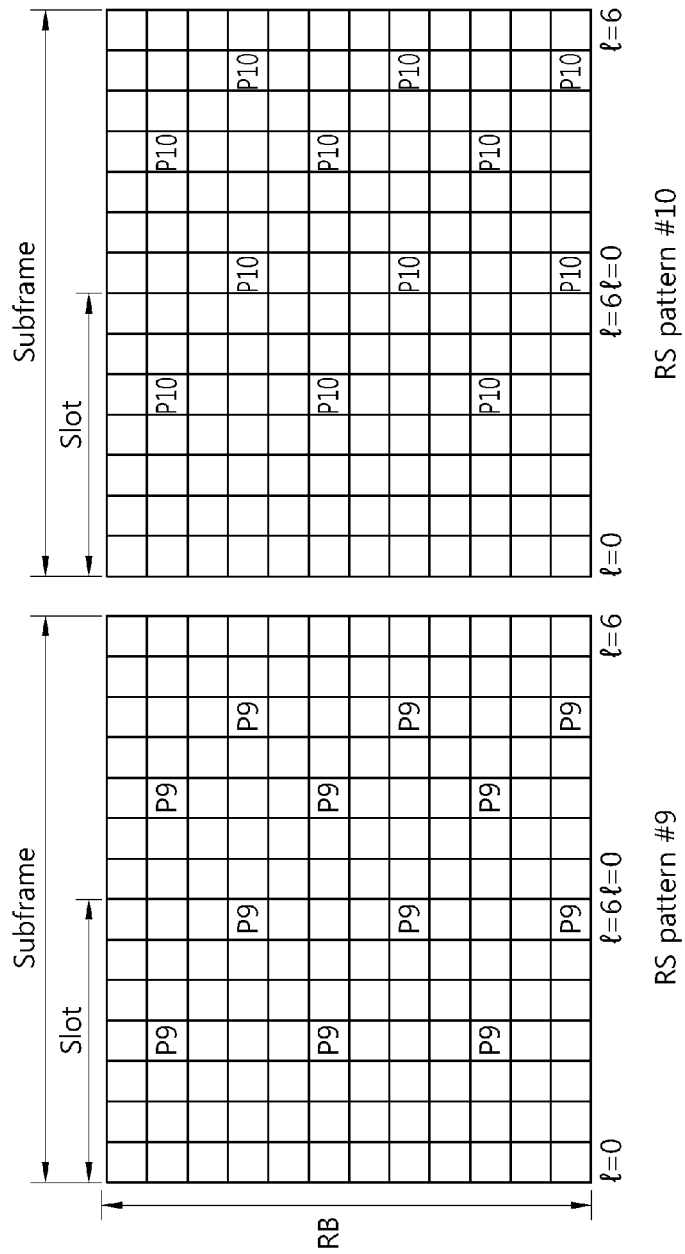
Figure 24:
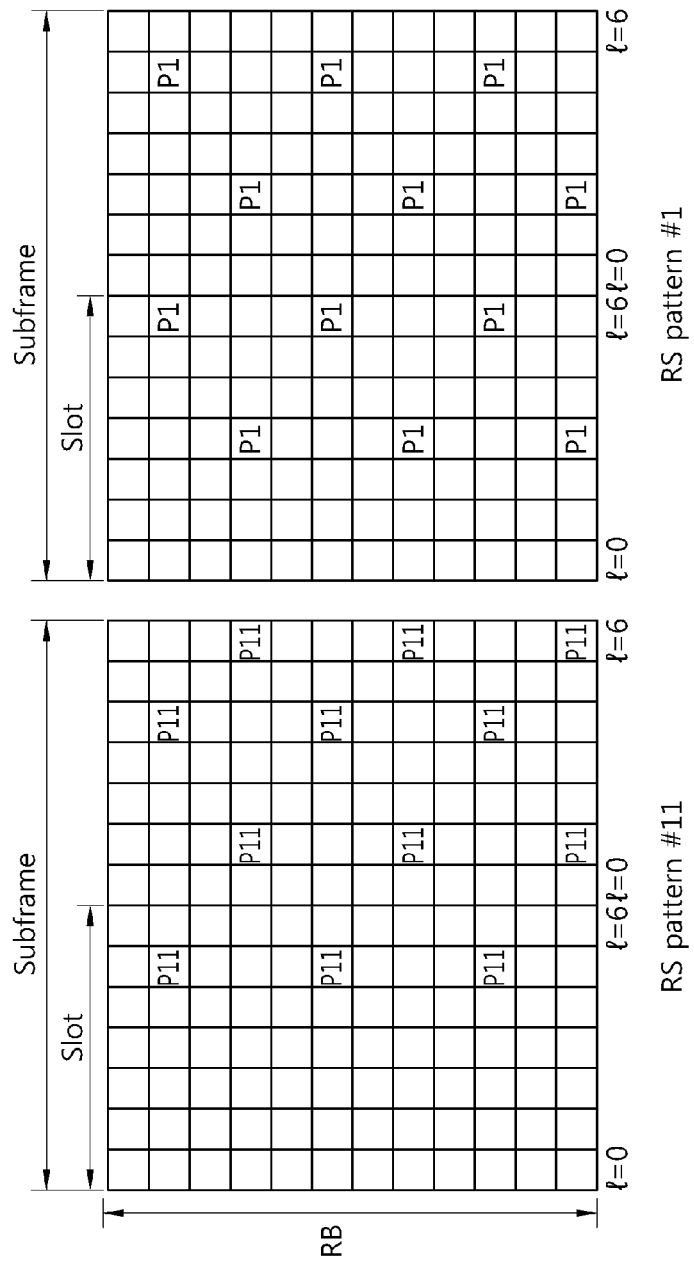

FIG. 17 and FIG. 18 show examples of configuring a plurality of RS patterns by using frequency shift.

Referring to FIG. 17 and FIG. 18, four types of RS patterns may be configured by using frequency shift from an RS pattern #1. The RS pattern #1 may be a basic RS pattern. Pn denotes a resource element used for RS transmission in an RS pattern #n (where n=1, 2, 3, 4). The resource element Pn may not be used in transmission of other data except for an RS. Alternatively, the resource element Pn may also be used in data transmission. In this case, data transmitted using the resource element Pn may act as interference to an RS transmitted using the resource element Pn.

Although up to four RS patterns are possible, only a specific RS pattern may be used selected from the four RS patterns in practice.

Up to four spatial streams can be simultaneously transmitted by identifying them with an independent RS. However, more than four spatial streams may be transmitted by using four RS patterns. In case of the MU-MIMO, when a plurality of UEs share one RS pattern, four or more spatial streams can be transmitted. System performance deterioration can be reduced when one RS pattern is shared by grouping UEs in which spatial interference occurs to the minimum extent.

To demodulate downlink data by using an RS, a UE has to know which RS pattern is allocated to the UE among a plurality of RS patterns.

A BS may transmit pattern information indicating the RS pattern allocated to the UE.

The pattern information may be transmitted through physical layer signaling or higher layer signaling. In case of the physical layer signaling, RS information may be included in a downlink grant transmitted on a PDCCH. The downlink grant may be scheduling information for an information stream of a spatial layer allocated to the UE. One example of the higher layer signaling is RRC signaling.

Alternatively, the UE may know the RS pattern of the UE according to a pre-determined manner. In this case, the BS does not have to signal the pattern information to the UE. For example, the RS pattern of the UE may be determined according to a UE ID.

A basic RS pattern used herein conforms to the dedicated RS mapping scheme in the LTE of FIG. 11 when using a normal CP. The basic RS pattern may conform to the mapping scheme of FIG. 12. However, this is for exemplary purposes only, and the basic RS pattern is not limited thereto.

B. Time Shift

Each of a plurality of RS patterns may be an RS pattern which is time-shifted from a basic RS pattern. Each of the plurality of RS patterns may be an RS pattern in which the basic RS pattern is cyclic-shifted by an n-OFDM symbol in a time domain (where n is an integer other than a negative integer). In this case, an OFDM symbol corresponding to a control region in a subframe may be excluded when cyclic shift is performed. For example, the control region consists of OFDM symbols of which an OFDM symbol index l is 0 to 2 in a first slot of the subframe (see FIG. 4). The number of OFDM symbols used in PDCCH transmission may change in every subframe, and thus an RS pattern may change in every subframe. Otherwise, the RS pattern may not change in every frame by fixing the OFDM symbol excluded in cyclic shift.

A different RS pattern may be allocated to each of the R spatial layers. In doing so, RSs for the respective spatial layers may not cause spatial interfere to each other. In case of the MU-MIMO, a different RS pattern may be allocated to each UE.

FIG. 19 to FIG. 24 show examples of configuring a plurality of RS patterns by using time shift.

Referring to FIG. 19 to FIG. 24, 11 types of RS patterns may be configured by using time shift from an RS pattern #1. The RS pattern #1 may be a basic RS pattern. Pn denotes a resource element used for RS transmission in an RS pattern #n (where n=1, 2, 3, 4). The resource element Pn may not be used in transmission of other data except for an RS. Alternatively, the resource element Pn may also be used in data transmission. In this case, data transmitted using the resource element Pn may act as interference to an RS transmitted using the resource element Pn.

Although up to 11 RS patterns are possible, only a specific RS pattern may be used selected from the 11 RS patterns in practice.

Up to 11 spatial streams can be simultaneously transmitted by identifying them with an independent RS. However, more than 11 spatial streams may be transmitted by using 11 RS patterns. In case of the MU-MIMO, when a plurality of UEs share one RS pattern, 11 or more spatial streams can be transmitted. System performance deterioration can be reduced when one RS pattern is shared by grouping UEs in which spatial interference occurs to the minimum extent.

A BS may transmit pattern information indicating the RS pattern allocated to the UE. The pattern information may be transmitted through physical layer signaling or higher layer signaling. Alternatively, the UE may know the RS pattern of the UE according to a predetermined manner.

Herein, different RS patterns are configured using time shift in the remaining OFDM symbols other than first three OFDM symbols (OFDM symbol index l=0, 1, 2) of a first slot in a subframe. A plurality of RS patterns may be configured using time shift in the remaining OFDM symbols other than first two OFDM symbols of the first slot.

A basic RS pattern used herein conforms to the dedicated RS mapping scheme in the LTE of FIG. 11 when using a normal CP. The basic RS pattern may conform to the mapping scheme of FIG. 12. However, this is for exemplary purposes only, and the basic RS pattern is not limited thereto.

C. Frequency Shift and/or Time Shift

Each of a plurality of RS patterns may be an RS pattern which is time- and frequency-shifted from a basic RS pattern. Each of the plurality of RS patterns may be an RS pattern in which the basic RS pattern is cyclic-shifted by an m-subcarrier in a frequency domain and by an n-OFDM symbol in a time domain (where m and n are integers other than a negative integer). For example, in addition to the 11 RS patterns of FIG. 19 to FIG. 24, the plurality of RS patterns may be RS patterns which are time-shifted respectively from the RS patterns #2, #3, and #4 of FIG. 17 and FIG. 18.

An RS pattern set of which elements are a plurality of RS patterns may be configured. Each of the plurality of RS patterns included in the RS pattern set may be one-to-one mapped to a pattern index. A subset of the RS pattern set may also be configured. RS patterns suitable for a communication environment may be configured by being selected from the RS patterns included in the RS pattern set. An RS pattern of a spatial layer may be selected from the RS pattern set or the subset thereof.

A BS may transmit pattern information indicating the RS pattern allocated to the UE.

The pattern information may be a pattern index. The pattern information may be transmitted through physical layer signaling or higher layer signaling. Alternatively, the UE may know the RS pattern of the UE according to a predetermined manner.

D. CDM

When an RS for each spatial layer is transmitted using the FDM and/or the TDM, the same sequence may be used for an RS sequence for each spatial layer. However, if an RS of a spatial layer #n and an RS of a spatial layer #m are transmitted using the same time-frequency resource, different sequences may be used for an RS (i.e., RS #n) of the spatial layer #n and an RS (i.e., RS #m) of a spatial layer #m.

Therefore, for each spatial layer, a different RS sequence may be input to a precoder. When the different RS sequence is used for each spatial layer, RS sequences can be divided even if they are transmitted using the same time-frequency resources. That is, if the RS #n and the RS #m are different from each other, the spatial layer #n and the spatial layer #m may use the same RS pattern.

R RS sequences input to the precoder may be different from each another. R spatial layers may all use the same RS pattern. In this case, in an OFDM symbol including a resource element by which an RS is transmitted, RS symbols for the R spatial layers are simultaneously transmitted.

The RS sequence may be selected from a sequence set of which elements are a plurality of sequences. The plurality of sequences included in the sequence set may be orthogonal to each another, or may have a low correlation. There is no particular restriction on the sequences constituting the sequence set. Each of the sequences belonging to the sequence set may be one-to-one mapped to one sequence.

Hereinafter, an example of configuring a sequence set will be described.

A base sequence may be cyclic-shifted by a different cyclic shift (CS) amount in a time domain to generate a plurality of cyclic-shifted sequences. The cyclic shift of the base sequence in the time domain may be implemented by a product between a phaseshifted sequence and the base sequence in a frequency domain.

The dedicated RS sequence r(m) of Equation 4 may be used as the base sequence. A cyclic-shifted sequence $r_i(m)$ obtained by cyclic-shifting the base sequence can be obtained by the following equation.

MathFigure 8

$$r_i(m) = r(m) e^{-j\theta_i m} \quad \text{[Math.8]}$$

Herein, i=1, 2, ..., N, and $\theta_i$ denotes a CS amount. According to i, N cyclic-shifted sequences can be generated. N may vary depending on a channel condition. The CS amount $\theta_i$ can be expressed by the following equation.

MathFigure 9

$$\theta_i = \frac{2\pi(i-1)}{N} \quad \text{[Math. 9]}$$

If $\theta_i$ is 0, the cyclic-shifted sequence becomes equal to the base sequence.

As such, when the CDM is used, a plurality of spatial layers may use the same RS patterns. If N different sequences can be used as the RS sequence, the same RS pattern may be configured in a time-frequency domain or N RS patterns may be configured in a code domain. Accordingly, RSs for the plurality of spatial layers can be simultaneously transmitted. In case of the MU-MIMO, a different RS sequence may be allocated to each UE.

A BS may transmit code information indicating the RS sequence allocated to the UE. The information code may be a sequence index or a CS amount indicator. The code information may be transmitted through physical layer signaling or higher layer signaling. Alternatively, the UE may know the RS sequence of the UE according to a predetermined manner.

E. TDM, FDM and/or CDM

If R denotes a rank, R spatial layers are divided into K CDM groups (where K≤R). Each of the K CDM groups uses a different RS pattern in a time-frequency domain. Each RS pattern may be a pattern which is time- and/or frequency-shifted from a basic RS pattern. A different RS sequence is used for each spatial layer belonging to the same CDM group. Each RS sequence may be a sequence which is cyclic-shifted from a base sequence. As such, an RS for each spatial layer may be transmitted using the TDM, the FDM, and/or the CDM.

For example, R spatial layers may be divided into two CDM groups. The division may be achieved in such a manner that K spatial layers out of the R spatial layers belong to a CDM group #1, and R-K spatial layers other than the K spatial layers belong to a CDM group #2. Spatial layers belonging to the CDM group #1 use an RS pattern #1, and spatial layers belonging to the CDM group #2 use an RS pattern #2. The RS pattern #2 may be a pattern which is time- and/or frequency-shifted from the RS pattern #1. A different RS sequence is allocated to each of the K spatial layers belonging to the CDM group #1. A different RS sequence is allocated to the K spatial layers belonging to the CDM group #2.

Figure 25:
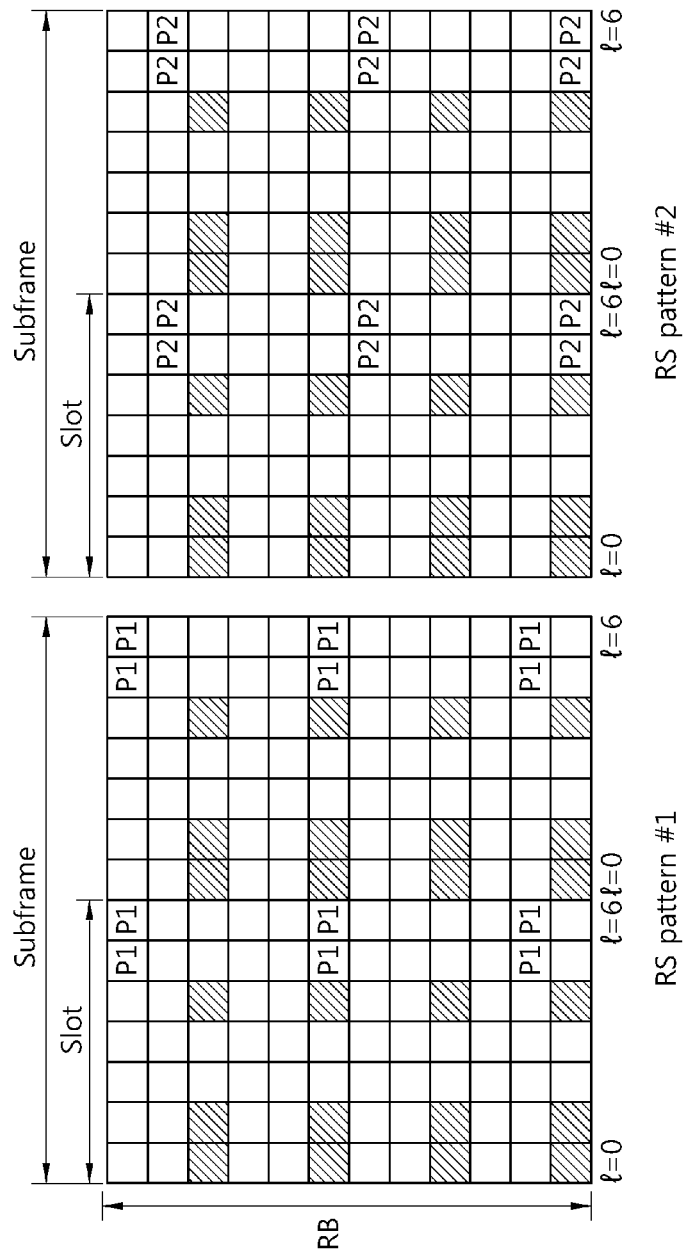
FIG. 25 shows another example of using two RS patterns.

FIG. 25 shows another example of using two RS patterns.

Referring to FIG. 25, an RS pattern #2 is a pattern which is frequency-shifted by one subcarrier from an RS pattern #1. For example, if the number of spatial layers is 8, spatial layers having spatial layer indices 0, 1, 4, and 5 (or 0, 1, 4, and 6) may use the RS pattern #1. A different RS sequence is allocated to each of spatial layers having spatial layer indices 0, 1, 4, and 5 (or 0, 1, 4, and 6). Spatial layers having spatial layer indices 2, 3, 6, and 7 (or 2, 3, 5, and 7) may use the RS pattern #2. A different RS sequence is allocated to each of the spatial layers having spatial layer indices 2, 3, 6, and 7 (or 2, 3, 5, and 7). However, this is for exemplary purposes only, and spatial layers sharing one RS pattern are not limited thereto.

A resource element indicated by a slashed line in the figure may be used for common RS transmission. For example, resource elements included in OFDM symbols having OFDM symbol indices 0 to 2 in a first slot of a subframe may be used for control information transmission. Remaining resource elements other than the resource elements used for transmission of the common RS, the dedicated RS, and the control information may be used for downlink data transmission.

As such, if an RS for each spatial layer is transmitted using the TDM, the FDM, and/or the CDM, a UE has to know RS information which is information on an RS of a spatial layer allocated to the UE.

A BS may transmit the RS information to the UE. The RS information may be transmitted through physical layer signaling such as PDCCH transmission or higher layer signaling such as RRC signaling. The RS information may include pattern information and code information. The pattern information indicates an RS pattern of a time-frequency domain allocated to the UE. The pattern information may be a CDM group indicator. The code information indicates an RS sequence allocated to the UE. The information code may be a sequence index or a CS amount indicator.

The RS information may be included in a downlink grant when transmitted on a PDCCH. The downlink grant may further include a spatial layer index indicating a spatial layer allocated to the UE.

In case of the MU-MIMO, the UE cannot know an RS pattern and RS sequence allocated to another UE in general. Therefore, a signal of a spatial layer allocated to a second UE may act as interference to a first UE.

It is assumed that a code that can be used in each CDM group is predetermined. If the first UE knows a CDM group to which the first UE belongs and a code allocated to the first UE, the first UE can know that the remaining codes other than the code allocated to the first UE in the CDM group to which the first UE belongs are allocated to other UEs. That is, the first UE can know an RS pattern and RS sequence allocated to another scheduled UE included in the CDM group to which the first UE belongs. In this case, interference caused by another UE included in the CDM group to which the first UE belongs can be suppressed. However, a signal from another UE included in another CDM group to which the first UE does not belong directly acts as interference.

Dedicated RS power boosting may be performed to improve channel estimation capability.

F. Support of Multiple Spatial Layers for Single UE

In case of the MU-MIMO, multiple spatial layers may be supported to a single UE. In this case, a method of identifying each UE may be different from a method of identifying a plurality of spatial layers allocated to one UE. Hereinafter, the method of identifying the plurality of spatial layers allocated to one UE is referred to as a sub-RS identification method, and the method of identifying each UE is referred to as a super-RS identification method.

For example, the super-RS identification method may use the FDM and/or the TDM, and the sub-RS identification method may use the CDM. If R denotes a rank, it is assumed that K spatial layers out of R spatial layers are allocated to a UE #1, and the remaining R-K spatial streams are allocated to a UE #2. Different RS patterns are allocated to the UE #1 and the UE #2. For example, the RS pattern of the UE #2 may be a pattern which is time- and/or frequency-shifted from the RS pattern of the UE #1. That is, each UE is identified by an RS pattern in a time-frequency domain. The UE #1 identifies K spatial layers by using CDM. The UE #2 identifies R-K spatial layers by using CDM. That is, a plurality of spatial layers allocated to one UE are identified by different RS sequences.

A UE may know in advance sub-RS information for identifying the plurality of spatial layers allocated to the UE. In this case, when the UE knows the number of spatial layers allocated to the UE and super-RS information for identifying the UE from other UEs, the UE can receive the plurality of spatial streams allocated to the UE.

FIG. 26 shows an exemplary case of using different RS patterns for super-RS identification.

Referring to FIG. 26, a UE #1 uses an RS pattern #1, and a UE #2 uses an RS pattern #2. That is, the super-RS identification method may use the FDM.

Now, the sub-RS identification method will be described.

(1) Method 1

To identify a plurality of spatial layers allocated to one UE, a time-shifted pattern may be used for each spatial layer. Regarding a UE #1, patterns which are time-shifted from an RS pattern #1 may be used to identify a plurality of spatial layers allocated to the UE 1. Regarding a UE #2, patterns which are time-shifted from an RS pattern #2 may be used to identify a plurality of spatial layers allocated to the UE #2. That is, the super-RS identification method uses the FDM, and the sub-RS identification method uses the TDM.

A time shift amount for identifying spatial layers in a UE may be predetermined. For example, it may be determined such that an RS pattern allocated to a first spatial layer among spatial layers allocated to the UE is always time-shifted by 0 OFDM symbol, and an RS pattern allocated to a second spatial layer is time-shifted by 2 OFDM symbols. Alternatively, the time shift amount for identifying spatial layers may be semi-statically determined. In this case, the time shift amount for identifying spatial layers in the UE may be transmitted through RRC signaling. Otherwise, the time shift amount for identifying spatial layers in the UE may be dynamically determined. In this case, it may be reported through a PDCCH whenever downlink data is transmitted.

(2) Method 2

To identify a plurality of spatial layers allocated to one UE, the CDM may be used. An RS sequence may be predetermined. Alternatively, code information may be transmitted from a BS. That is, the super-RS identification method uses the FDM, and the sub-RS identification method uses the TDM.

FIG. 27 is a block diagram of an apparatus for wireless communications in which the embodiments of the present invention are implemented. A BS 50 includes a processor 51 and an antenna 59.

The processor 51 is coupled to the antenna 59 and configured to implement the proposed functions, processes, and/or methods. The layers of a protocol stack can be implemented by the processor 51. The antenna 59 is configured to receive and transmit signals. The number of antennas 59 may be 1 or more. The BS 50 may further include memory (not shown). The memory (not shown) is coupled to the processor 51 and configured to store various pieces of information for driving the processor 51.

A UE 60 includes a processor 61 and an antenna 69. The processor 61 is coupled to the antenna 69 and configured to implement the proposed functions, processes, and/or methods. The layers of a wireless interface protocol may be implemented by the processor 61. The antenna 69 is configured to receive and transmit signals. The number of antennas 69 may be 1 or more. The BS 60 may further include memory (not shown). The memory (not shown) is coupled to the processor 61 and configured to store various pieces of information for driving the processor 61.

Each of the processors 51 and 61 may include an application-specific integrated circuit (ASIC), other chipsets, a logic circuit, a data processor and/or an RF unit for converting a baseband signal into a radio signal or vice versa. The proposed transmitter may be implemented within each of the processors 51 and 61. The memory (not shown) may include read-only memory (ROM), random access memory (RAM), flash memory, a memory card, a storage media and/or other storage devices. In the case in which the embodiments are implemented in software, the above-described schemes or methods may be implemented using module processes, functions, etc. which are configured to perform the above functions. The modules may be stored in the memory (not shown) and executed by the processors 51 and 61. The memory (not shown) may be placed internally or externally to each of the processors 51 and 61 and coupled to each of the processors 51 and 61 through a variety of well-known means.

An apparatus and method for effectively transmitting signals in a wireless communication system are provided. Spatial interference between reference signals (RSs) can be minimized. To avoid the interference between the RSs for each spatial layer, FDM, TDM, and/or CDM may be used. In case of MU-MIMO, interference between multiple users can be effectively reduced. In case of multi-cell MU-MIMO, interference between multiple users can also be effectively reduced. In addition, power control can be effectively performed according to a signal to noise ratio (SNR). Therefore, overall system performance can be improved.

A person having ordinary skill in the art may easily understand additional advantages, objects, and characteristics of the present invention through the above de-scription or the implementation of the present invention based on the above description. In the case in which those skilled in the art practices the present invention based on the above description, the present invention may further have unpredictable advantages.

Although, in the above illustrative system, the methods have been described on the basis of the flowcharts in the form of a series of the steps or blocks, the present invention is not limited to the sequence of the steps, and some of the steps may be performed at different sequences from the remaining steps or simultaneously with them. Further, those skilled in the art will understand that the steps shown in the flowcharts are not exclusive, the steps may include other steps, or one or more steps of the flowcharts may be deleted without affecting the scope of the present invention.

The above-described embodiments include various aspects of illustrations. Though all kinds of possible combinations for representing the various aspects may not be described, those skilled in the art will understand that other possible combinations are possible. For example, those skilled in the art may use each of the elements described in the embodiments in such a way as to combine the elements. Accordingly, the present invention is not to be limited to the embodiments, but is intended to cover the widest range which complies with the disclosed principles and new characteristics.

The invention claimed is:

1. A signal transmission apparatus comprising:
N antennas;
a processor coupled to the N antennas and configured to generate N transmit signals by performing precoding on R spatial streams for R spatial layers, and to transmit the N transmit signals respectively through the N antennas,
wherein an information stream, a reference signal sequence, and a reference signal pattern are allocated to each of the R spatial layers, and the reference signal pattern is a time-frequency resource pattern used for transmission of the reference signal sequence,
wherein each of the R spatial streams corresponds to one spatial layer,
wherein each of the R spatial streams is generated based on the information stream, reference signal sequence, and reference signal pattern allocated to a corresponding spatial layer, and
wherein a different reference signal sequence is allocated to each of the R spatial layers.

2. The apparatus of claim 1, wherein a different reference signal pattern is allocated to each of the R spatial layers.

3. The apparatus of claim 1, wherein the reference signal pattern is a pattern which is frequency-shifted from a basic reference signal pattern.

4. The apparatus of claim 1, wherein the reference signal pattern is a pattern which is time-shifted from a basic reference signal pattern.

5. The apparatus of claim 1, wherein the reference signal pattern is a pattern which is time- and frequency-shifted from a basic reference signal pattern.

6. The apparatus of claim 1, wherein the R spatial layers are allocated to K user equipments (where K≤R).

7. The apparatus of claim 1,
wherein a first reference signal pattern is allocated to K spatial layers out of the R spatial layers, and a second reference signal pattern is allocated to R-K spatial layers other than the K spatial layers,
wherein a different reference signal sequence is allocated to each of the K spatial layers, and
wherein a different reference signal sequence is allocated to each of the R-K spatial layers.

8. The apparatus of claim 7, wherein reference signal information which is information on a reference signal of a spatial layer allocated to a user equipment is transmitted to the user equipment.

9. The apparatus of claim 8,
wherein the reference signal information comprises pattern information and code information, and
wherein the pattern information indicates a reference signal pattern allocated to the user equipment, and the code information indicates a reference signal sequence allocated to the user equipment.

10. The apparatus of claim 8,
wherein the reference signal information is included in a downlink grant, and
wherein the downlink grant is scheduling information for an information stream of a spatial layer allocated to the user equipment.

11. The apparatus of claim 8, wherein the reference signal information is transmitted through higher layer signaling.

12. A signal transmission method performed by a base station in a wireless communication system, the method comprising:
generating N transmit signals by performing precoding on R spatial streams for R spatial layers; and
transmitting the N transmit signals respectively through N antennas,
wherein an information stream, a reference signal sequence, and a reference signal pattern are allocated to each of the R spatial layers, and the reference signal pattern is a time-frequency resource pattern used for transmission of the reference signal sequence,
wherein each of the R spatial streams corresponds to one spatial layer,
wherein each of the R spatial streams is generated based on the information stream, reference signal sequence, and reference signal pattern allocated to a corresponding spatial layer, and
wherein a different reference signal sequence is allocated to each of the R spatial layers.

13. The method of claim 12, further comprising transmitting, to a user equipment, reference signal information which is information on a reference signal of a spatial layer allocated to the user equipment.

* * * * *